United States Patent
Sasaki et al.

(10) Patent No.: US 11,560,106 B2
(45) Date of Patent: Jan. 24, 2023

(54) CONTROL DEVICE FOR VEHICLE-MOUNTED APPARATUS

(71) Applicant: HITACHI AUTOMOTIVE SYSTEMS, LTD., Hitachinaka (JP)

(72) Inventors: Mitsuo Sasaki, Hadano (JP); Masaki Itabashi, Hanno (JP); Tadashi Suganuma, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 441 days.

(21) Appl. No.: 16/622,153

(22) PCT Filed: May 9, 2018

(86) PCT No.: PCT/JP2018/017867
§ 371 (c)(1),
(2) Date: Dec. 12, 2019

(87) PCT Pub. No.: WO2018/230197
PCT Pub. Date: Dec. 20, 2018

(65) Prior Publication Data
US 2020/0130615 A1 Apr. 30, 2020

(30) Foreign Application Priority Data
Jun. 14, 2017 (JP) .............................. JP2017-116363

(51) Int. Cl.
*B60R 16/023* (2006.01)
*G07C 5/08* (2006.01)
(Continued)

(52) U.S. Cl.
CPC ............ *B60R 16/0231* (2013.01); *B62D 5/00* (2013.01); *G06F 11/07* (2013.01);
(Continued)

(58) Field of Classification Search
CPC .... B60R 16/0231; B62D 5/00; B62D 5/0424; B62D 5/0457; B62D 5/0484; G06F 11/00;
(Continued)

(56) References Cited

U.S. PATENT DOCUMENTS 5,360,077 A * 11/1994 Nishimoto ........... B62D 5/0478
701/43
2002/0083036 A1 6/2002 Price
(Continued)

FOREIGN PATENT DOCUMENTS

JP H6-56045 A 3/1994
JP 2004-516575 A 6/2004
(Continued)

OTHER PUBLICATIONS

International Search Report issued in corresponding application No. PCT/JP2018/017867 dated Jul. 17, 2018 with English translation.
(Continued)

*Primary Examiner* — Peter D Nolan
*Assistant Examiner* — Ce Li Li
(74) *Attorney, Agent, or Firm* — Foley & Lardner LLP

(57) ABSTRACT

A control device for a vehicle-mounted apparatus, the control device includes: a second CPU state judging section provided to the first CPU, and configured to judge a state of the second CPU based on a state of the inter-CPU communication and a voltage value of the electric power supplied from the first electric power supply section, or the second reset signal; and a first CPU state judging section provided to the second CPU, and configured to judge a state of the first CPU based on the state of the inter-CPU communication and a voltage value of the electric power supplied from the second electric power supply section, or the first reset signal.

14 Claims, 13 Drawing Sheets

(51) Int. Cl.
*G06F 11/30* (2006.01)
*G06F 11/07* (2006.01)
*B62D 5/00* (2006.01)
*G07C 5/00* (2006.01)
*B62D 5/04* (2006.01)
*G06F 11/00* (2006.01)

(52) U.S. Cl.
CPC .......... *G06F 11/0793* (2013.01); *G06F 11/30* (2013.01); *G06F 11/3024* (2013.01); *G06F 11/3058* (2013.01); *G07C 5/006* (2013.01); *G07C 5/0808* (2013.01); *B62D 5/0457* (2013.01); *G06F 11/00* (2013.01)

(58) Field of Classification Search
CPC ...... G06F 11/07; G06F 11/0793; G06F 11/20; G06F 11/277; G06F 11/30; G06F 11/3013; G06F 11/3024; G06F 11/3058; G07C 5/006; G07C 5/0808; H02P 29/028
See application file for complete search history.

(56) References Cited

U.S. PATENT DOCUMENTS

2010/0004811 A1* 1/2010 Kannan ................. G07C 5/085
701/36
2011/0246820 A1* 10/2011 Murao ................ G06F 11/1637
714/10

FOREIGN PATENT DOCUMENTS

JP 2004-328488 A 11/2004
JP 2013-232142 A 11/2013
WO WO-2011/114493 A1 9/2011

OTHER PUBLICATIONS

Written Opinion of the International Searching Authority issued in corresponding application No. PCT/JP2018/017867 dated Jul. 17, 2018 with English translation.

* cited by examiner

CONTROL DEVICE FOR VEHICLE-MOUNTED APPARATUS

TECHNICAL FIELD

This invention relates to a control device for a vehicle-mounted apparatus.

BACKGROUND ART

A device described in a following patent document 1 is known as a conventional control device for a vehicle-mounted apparatus.

That is, in this control device, at the resets of the first CPU and the second CPU, the first CPU and the second CPU are reset at the same time. With this, the stabilities of the operations of the first CPU and the second CPU are ensured.

PRIOR ART DOCUMENT

Patent Document

Patent Document 1: Japanese Patent Application Publication No. H06-056045

SUMMARY OF THE INVENTION

Problems which the Invention is Intended to Solve

However, in a case where the first CPU and the second CPU are constantly reset at the same time like the conventional control device for the vehicle-mounted apparatus, there is a problem that the control cannot be intervened during the reset.

When the only one of the CPUs which needs the reset is reset, the inter-CPU communication is shut off. Accordingly, it is not possible to appropriately judge the operation state of the one of the CPUs from the other of the CPUs which is not in the reset state.

That is, it is difficult to judge whether the one of the CPUs in which the inter-CPU communication is shut off is in the reset state, or to judge whether or not the CPU or the inter-CPU communication is in the abnormal state.

It is, therefore, an object to provide a control device for a vehicle-mounted apparatus devised to solve the above-mentioned problems, and to judge whether or not the CPU in which the inter-CPU communication is shut off is in the reset state.

Means for Solving the Problem

In the present invention, specifically, a first CPU and a second CPU include, respectively, a first CPU state judging section configured to judge a state of one of the CPUs based on a state of an inter-CPU communication and a voltage value of a supply power source or the first reset signal.

Benefit of the Invention

In the present invention, it is possible to judge whether or not the CPU in which the inter-CPU communication is shut off is in the reset state.

DESCRIPTION OF EMBODIMENTS

Hereinafter, a control device for a vehicle-mounted apparatus according to the present invention is explained with reference to the drawings. Besides, in below-described embodiments, this control device is applied to an electric power steering device for a vehicle, like the conventional art.

(Configuration of Power Steering Device)

Figure 1:
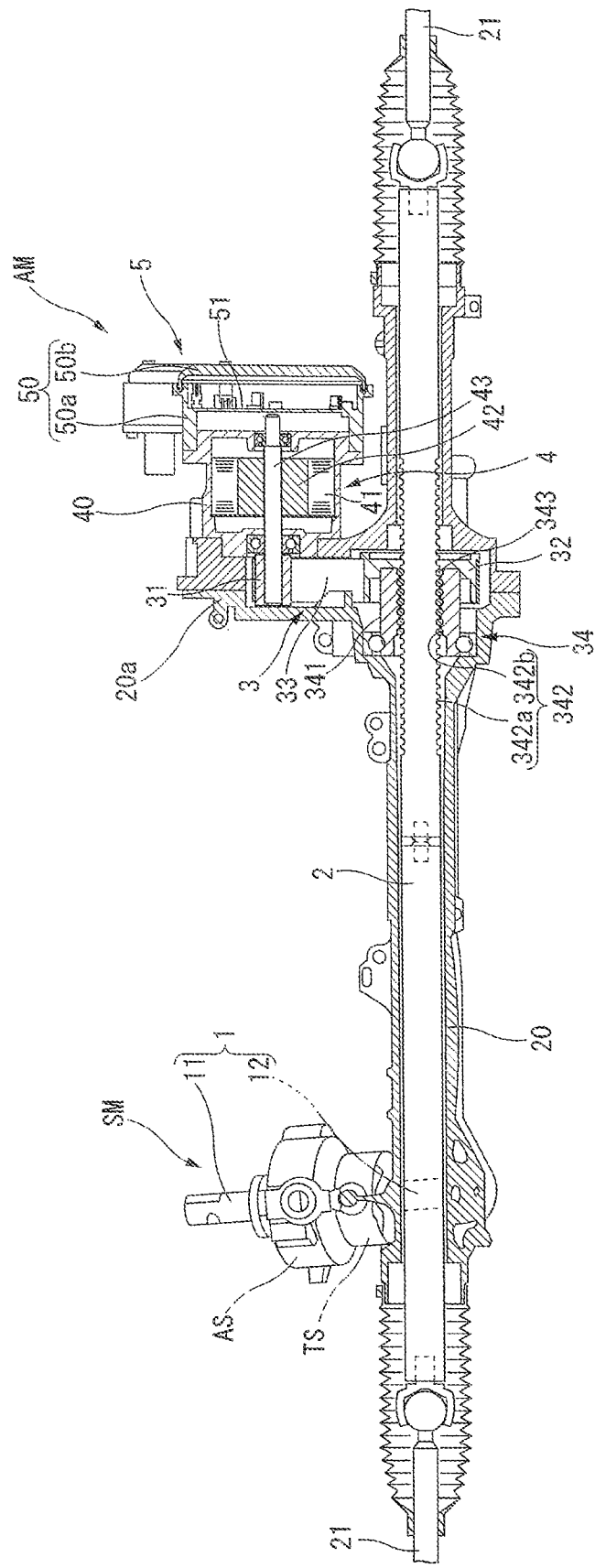
FIG. 1 is a perspective view showing a power steering device for a vehicle to which the present invention is applied.

FIG. 1 is a system configuration view showing a steering device to which the present invention is applied. Besides, in below-described explanations based on the drawing, an "axial direction" is defined by a direction parallel to a rotation axis Z of a steering shaft 1. A "radial direction" is defined by a direction perpendicular to the rotation axis Z of the steering shaft 1. A "circumferential direction" is defined by a direction around the rotation axis Z of the steering shaft 1. As to the axial direction, a "first end side" is defined by an upper side of FIG. 1. A second end side is defined by a lower side of FIG. 1.

As shown in FIG. 1, the steering device includes a steering mechanism SM for the steering based on operation of a driver; and a steering assist mechanism AM arranged to assist the steering operation of the driver.

The steering mechanism SM includes the steering shaft 1 linked to a steering wheel (not shown); and a rack bar 2 which is a steered shaft linked to the steered wheels (not shown). The steering shaft 1 and the rack bar 2 are linked through a conversion mechanism (not shown). The conversion mechanism is a rack and pinion mechanism including pinion teeth (not shown) formed on the steering shaft 1 (an output shaft 12 described later), and rack teeth (not shown) formed on the rack bar 2.

The steering shaft 1 includes an input shaft 11 arranged to rotate as a unit with the steering wheel (not shown); and an output shaft 12 linked to the rack bar 2. The input shaft 11 and the output shaft 12 are linked through a torsion bar (not shown). The input shaft 11 includes a first axial end portion (the upper end side of FIG. 1) connected to the steering wheel (not shown); and a second axial end portion connected to the torsion bar (not shown). The output shaft 12 includes a first axial end portion (the upper end side of FIG. 1) connected to the torsion bar (not shown); and a second axial end portion linked to the rack bar 2. That is, the pinion teeth (not shown) are formed on an outer circumference side of the second axial end portion of the output shaft 12. This pinion teeth of the output shaft 12 are engaged with the rack teeth (not shown) formed on an outer side portion of the rack bar 2, so that the rotation of the output shaft 12 is converted to an axial movement of the rack bar 3, and transmitted to the rack bar 3.

The rack bar 2 is received within a substantially cylindrical rack housing 2 extending in the axial direction. The rack bar 2 includes both axial end portions linked through tie rods 21 and 21 and knuckle arms (not shown) to the steered wheels. That is, the rack bar 3 is arranged to be moved in the axial direction to push or pull the knuckle arms (not shown) through the tie rods 21 and 21, and thereby to vary the directions of the steered wheels (not shown).

The steering assist mechanism AM includes an actuator which is a mechatronical integration (an integral device including a mechanical device and an electric device), and which is arranged to produce a steering assist force according to a driving state of the vehicle; and a transmitting mechanism 3 arranged to decrease a speed of the steering assist force produced by the actuator, and to transmit the speed-decreased steering assist force to the rack bar 2.

The actuator includes an electric motor 4 arranged to produce the steering assist force; and a control device 5 configured to control and drive the electric motor 4 based on detection results and so on by various sensors (the steering angle sensor AS, the torque sensor TS, a vehicle speed sensor, and so on) arranged to sense driving states of the vehicle. The steering angle sensor AS and the torque sensor TS are integrally constituted as one unit disposed on the outer circumference side of the steering shaft 1. The steering angle sensor AS is arranged to sense the steering angle which is a rotation amount from a neutral position of the steering wheel (not shown), based on a rotation angle difference between a pair of gears (not shown) arranged to be rotated in accordance with the rotation of the input shaft 11. The torque sensor TS is arranged to sense the steering torque inputted to steering shaft 1 by the driver, based on the relative rotation displacement between the input shaft 11 and the output shaft 12.

The transmitting mechanism 3 includes an input side pulley 31; an output side pulley 32; a belt member 33 wound around the both pulleys 31 and 32; and a ball screw 34 arranged to decrease a speed of a rotation of the output side pulley 32, and to convert the rotation of the output side pulley 32 to the axial movement of the rack bar 2. The input side pulley 31 is fixed on an output shaft 43 of the electric motor 4. The input side pulley 31 is arranged to rotate as a unit with the output shaft 43 around a second reference axis A2 corresponding to a rotation axis of the output shaft 43. The output side pulley 32 is disposed radially outside the rack bar 2. The output side pulley 32 is linked through the ball screw 34 to the rack bar 2. The output side pulley 32 is arranged to rotate as a unit with a nut 341. (described later) around a first reference axis A1 corresponding to a center axis of the rack bar 2. The belt member 33 is an endless V-belt in which glass fiber, copper wire, and so on are embedded as core member. The belt 33 is arranged to synchronously rotate the input side pulley 31 and the output side pulley 32, and thereby to transmit the rotation force of the input side pulley 31 to the output side pulley 32.

The ball screw 34 includes the cylindrical nut 341 disposed radially outside the rack bar 2; a ball circulation groove 342 formed between the nut 341 and the rack bar 2; a plurality of balls 343 provided within the ball circulation groove 342 to be rolled within the ball circulation groove 342; and a tube (not shown) which connects both ends of the ball circulation groove 342, and which is arranged to circulate the balls 343. The ball circulation groove 342 includes a shaft side ball screw groove 342*a* which is a helical groove provided on the outer circumference of the rack bar 2; and a nut side ball screw groove 342*b* which is a helical groove provided on the inner circumference of the nut 341.

The electric motor 4 is a surface magnet synchronous motor of a three phase alternating current type. The electric motor 4 includes a cylindrical stator 41 fixed on an inner circumference surface of the motor housing 40; a cylindrical rotor 42 disposed radially inside the stator 41 with a predetermined radial clearance; and the output shaft 43 fixed on the inner circumference side of the rotor 42. The motor housing 40 has a substantially cylindrical shape. The motor housing 40 includes a first end side connected to a transmitting mechanism receiving portion 20*a* formed at an axial intermediate portion of the rack housing 20; and a second end opening closed by a control housing 50 (described later). A tip end side (on the transmitting mechanism 3 side) of the output shaft 43 is located within the transmitting mechanism receiving portion 20*a*. This tip end side of the output shaft 43 is connected to the input side pulley 31. Moreover, a motor rotation angle sensor (not shown) arranged to sense the rotation angle of the output shaft 43 is provided on a base end side (the control device 5 side) of the output shaft 43. That is, the detection result of the motor rotation angle sensor is fed back to the control device 5. With this, the control device 5 drives and controls the electric motor 4.

The control device 5 includes a control board 51 on which electronic components such as microcomputers (a first CPU 61 and a second CPU 81 described later) configured to control energization of the electric motor 4 are mounted; and a control housing 50 having a rectangular cylindrical shape. The control board 51 is received within the control housing 50. The control device 5 is connected and fixed on the second end side opening portion of the motor housing 40. In the control device 5, the control board 51 is connected to the electric motor 4 and the motor rotation angle sensor (not shown) between the control housing 50 and the motor housing 40 (the transmitting mechanism receiving portion 20*a*) connected with each other. The control device 5 is configured to control and dive the electric motor 4 in accordance with the vehicle speed, the steering torque, and so on based on the motor rotation angle sensor. The control housing 50 includes a cylindrical body 50*a* covering the second end portion of the motor housing 40; and a cover 50*b* closing the second end side opening of the body 50*a*.

First Embodiment

FIG. 2 to FIG. 8 show a control device of a vehicle-mounted apparatus according to a first embodiment of the present invention.

(Configuration of Actuator)

Figure 2:
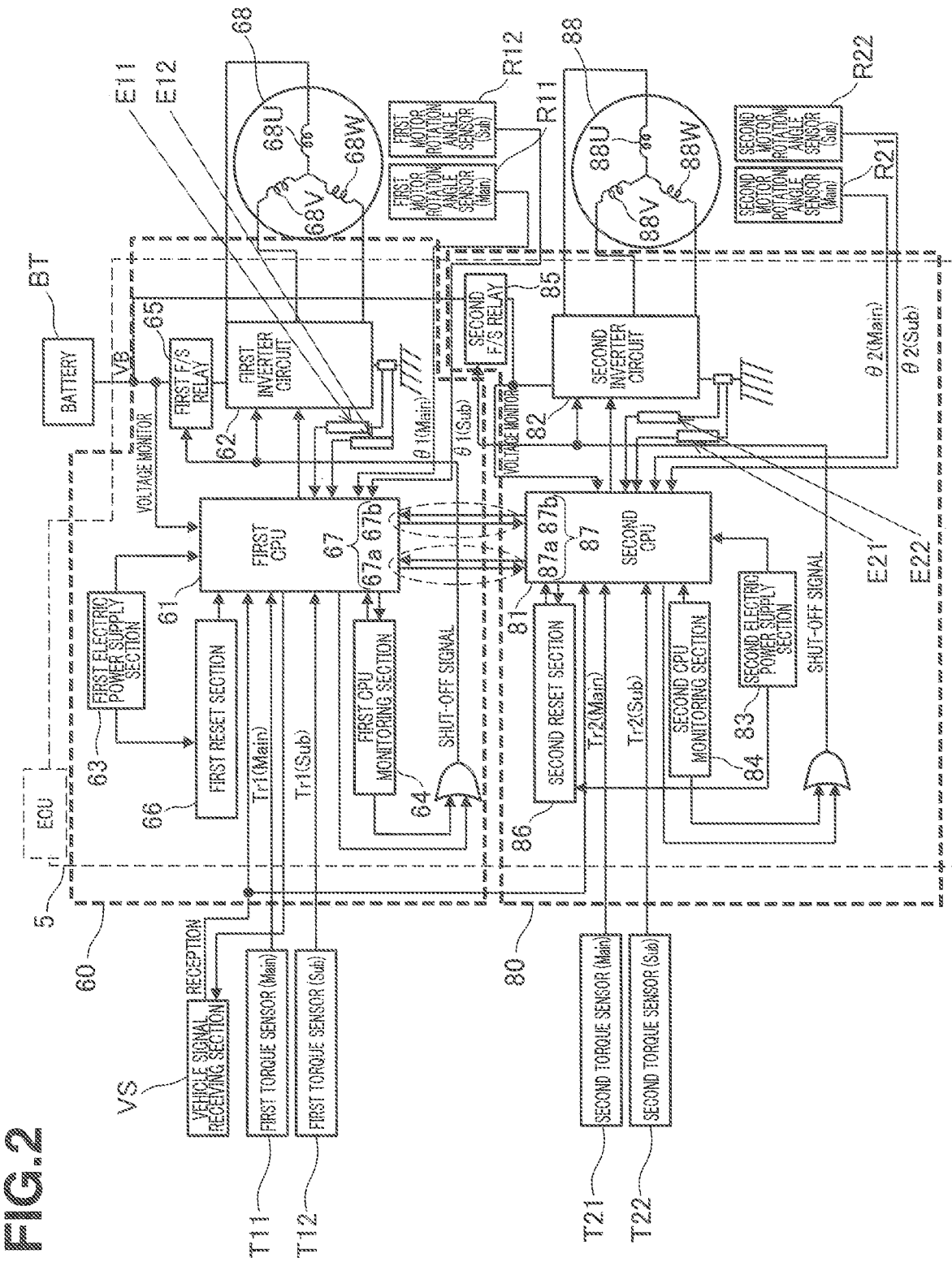
FIG. 2 is a system configuration view showing an actuator of the power steering device shown in FIG. 1.
Figure 3:
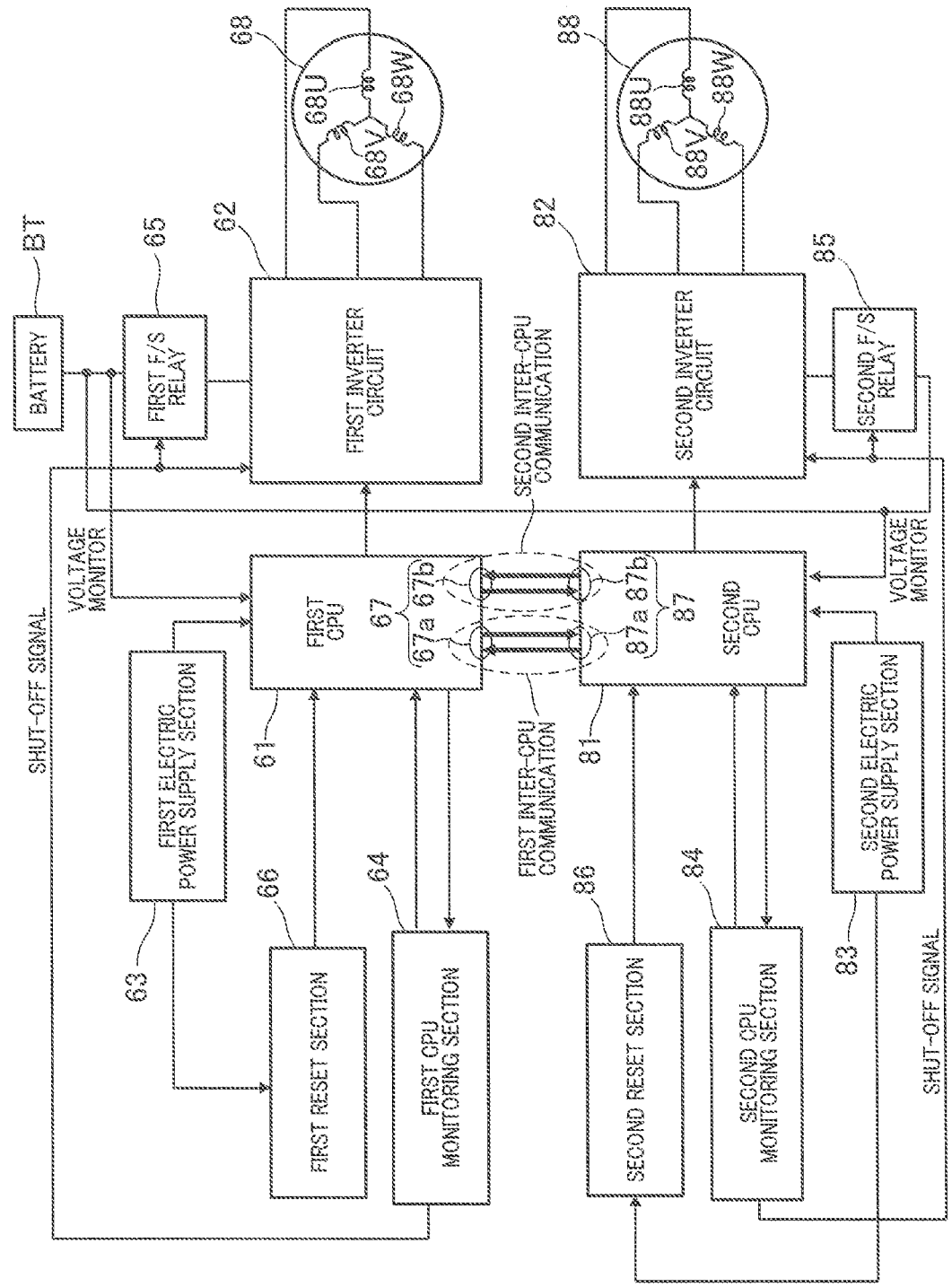
FIG. 3 is a system configuration view showing a control device shown in FIG. 2 showing a first embodiment of the present invention.

FIG. 2 is a system configuration view showing the actuator of the power steering device shown in FIG. 1. FIG. 3 is a view showing the control device of the vehicle-mounted apparatus according to the first embodiment of the present invention. FIG. 3 shows a system configuration view of the control device 5 shown in FIG. 2.

As shown in FIG. 2, the actuator is constituted by a dual type redundant system including a first control section 60 which is surrounded by a chain line in FIG. 2, and which is configured to control and drive a first three phase coil 68; and a second control section 80 which is surrounded by a chain line FIG. 2, and which is configured to control and drive a second three phase coil 88.

The first control section 60 includes a first CPU 61 configured to perform various calculations based on the electric power supply from a first electric power supply section 63; and a first inverter circuit 62 configured to be controlled and driven by a predriver (not shown) to which a command signal is inputted from the first CPU 61. On the other hand, the second control section 80 includes a second CPU 81 configured to perform various calculations based on the electric power supply from a second electric power supply section 83; and a second inverter circuit 82 configured to be controlled and driven by a second predriver (not shown) to which a command signal is inputted from the second CPU 81.

The first CPU 61 includes first and second first torque signal receiving sections T11 and T12 which are electrically connected, respectively, to a main sensor and a sub sensor of a first torque sensor TS1, and which are configured to receive first torque signals Tr1 (Main) and Tr1 (Sub) from the respective sensors. Moreover, the first CPU 61 includes first and second first motor rotation angle signal receiving sections R11 and R12 which are electrically connected, respectively, to a main sensor and a sub sensor of a first motor rotation angle sensor MS1, and which are configured to receive first motor rotation angle signals θm1 (Main) and θm1 (Sub) from the respective sensors. Moreover, the first CPU 61 includes a vehicle signal receiving section VS configured to receive various signals such as the vehicle speed signal, outputted from the vehicle side.

The second CPU 81 includes first and second second torque signal receiving sections T21 and T22 which are electrically connected, respectively, to a main sensor and a sub sensor of a second torque sensor TS2, and which are configured to receive second torque signals Tr2 (Main) and Tr2 (Sub) from the respective sensors. Moreover, the second CPU 81 includes first and second second motor rotation angle signal receiving sections R21 and R22 which are electrically connected, respectively, to a main sensor and a sub sensor of a second motor rotation angle sensor MS2, and which are configured to receive second motor rotation angle signals 8m2 (Main) and 6m2 (Sub) from the respective sensors.

Moreover, the first control section 60 and the second control section 80 include, respectively, a first CPU monitoring section 64 and a second CPU monitoring section 84 which are configured to monitor operation states of the first CPU 61 and the second CPU 81. The first CPU monitoring section 64 and the second CPU monitoring section 84 are configured to shut off the electric power supply to the first inverter circuit 62 and the second inverter circuit 82 when it is judged that the abnormality is generated in the first CPU 61 and the second CPU 81 that are monitored objects. That is, the first CPU monitoring section 64 is configured to output a shutoff signal to the first inverter circuit 62, and a first fail safe relay 65 disposed between a vehicle-mounted battery BT and the first inverter circuit 62, and thereby to shut off the electric power supply to the first inverter circuit 62. Similarly, the second CPU monitoring section 84 is configured to output a shutoff signal to the second inverter circuit 82, and a second fail safe relay 85 disposed between the battery BT and the second inverter circuit 82, and thereby to shut off the electric power supply to the second inverter circuit 82.

Moreover, the first control section 60 and the second control section 80 include, respectively, a first reset section 66 and a second reset section 86 configured to output a first reset signal Rs1 and a second reset signal Rs2 to the first CPU 61 and the second CPU 81, if necessary. The first reset section 66 and the second reset section 86 are configured to format (initialize) the first CPU 61 and the second CPU 81 at a predetermined timing such as the power-on, and the instantaneous blackout (voltage drop).

The first CPU 61 and the second CPU 81 include, respectively, a first inter-CPU communication section 67 and a second inter-CPU communication section 87 which are configured to perform inter-CPU communication which are transmissions (the sending and the receiving) of the signals with the counterpart CPUs 61 and 81. That is, the first CPU 61 and the second CPU 81 are communicated with each other through the first inter-CPU communication section 67 and the second inter-CPU communication section 87. With this, the first CPU 61 and the second CPU 81 monitor the operation states of the second CPU 81 and the first CPU 61. In this case, the first inter-CPU communication section 67 and the second inter-CPU communication section 87 employ different communication systems. For example, the first inter-CPU communication section 67 employs serial communication, and the second inter-CPU communication section 87 employs parallel communication.

The first inverter circuit 62 and the second inverter circuit 82 are constituted, respectively, by switching elements such as MOS-FET. The first inverter circuit 62 and the second inverter circuit 82 are configured to convert the direct current supplied from the battery BT to the three-phase alternating currents in accordance with the command signals from the corresponding predrivers (not shown), and to supply the three-phase alternating currents to the first three phase coil 68 and the second three phase coil 88. The first inverter circuit 62 is electrically connected to first and second first current sensing sections E11 and E12. The currents of the first inverter circuit 62 which are sensed by the sensing sections E11 and E12 are fed back to the first CPU 61. Similarly, the second inverter circuit 82 is electrically connected to the first and second second current sensing sections E21 and E22. The currents of the second inverter circuit 82 which are sensed by the sensing sections E21 and E22 are fed back to the second CPU 81.

The electric motor 4 is a three phase induction motor arranged to be driven based on the three phase alternating current. In the electric motor 4, a first u phase coil 68u, a first v phase coil 68v, a first w phase coil 68w, a second u phase coil 88u, a second v phase coil 88v, and a second w phase coil 88w are wound on teeth (not shown) formed on the inner circumference side of the stator 41 (cf. FIG. 1). That is, the stator 41 includes the first three phase coil 68 including the first u, v, w phase coils 68u, 68v, 68w; and the second three phase coil 88 including the second u, v, w phase coils 88u, 88v, 88w. The rotor 42 and the output shaft 43 (cf. FIG. 1) are driven by these three phase coils 68 and 88 of the two systems.

Figure 4:
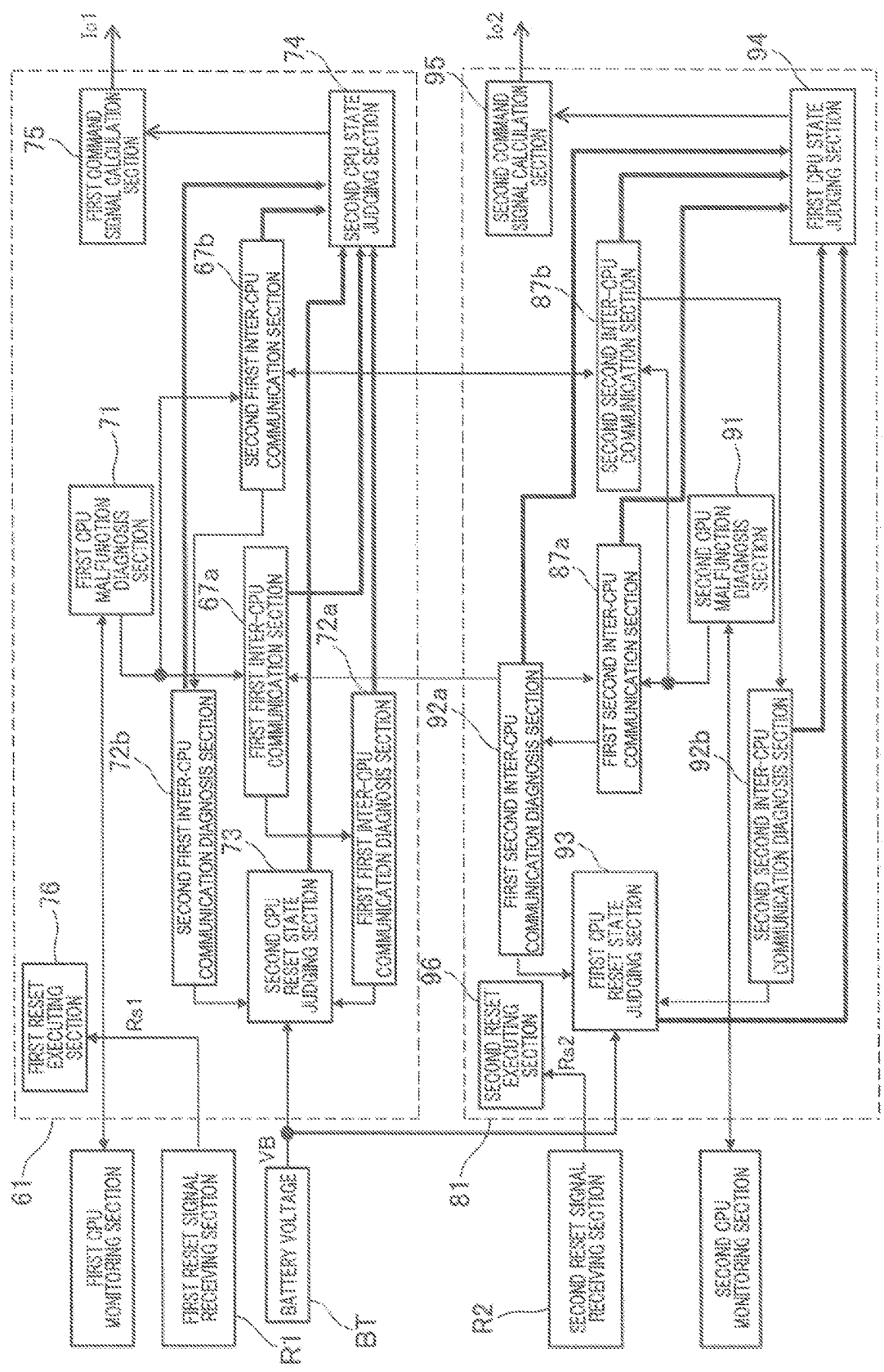
FIG. 4 is a control block diagram of a first CPU and a second CPU shown in FIG. 3.

FIG. 4 is a control block diagram of the first CPU 61 and the second CPU 81 which are shown in FIG. 3.

As shown in FIG. 4, the first CPU 61 includes a first CPU malfunction diagnosis section 71; a first inter-CPU communication section 67; a first inter-CPU communication diagnosis section 72; a second CPU reset state judging section 73; a second CPU state judging section 74; a first command signal calculation section 75; and a first reset executing section 76.

The first CPU malfunction diagnosis section 71 is configured to sense the abnormal state of the first CPU 61, and to output this information to the first CPU monitoring section 64. As described above, when it is judged that the abnormality is generated in the first CPU 61, the first CPU monitoring section 64 is configured to output the shutoff signal to the first fail safe relay 65 and the first inverter circuit 62 so as to shut off the electric power supply from the battery BT. Moreover, the first CPU malfunction diagnosis section 71 is configured to output the diagnosis result to the first inter-CPU communication section 67 (a first first inter-CPU communication section 67a and a second first inter-CPU communication section 67b described later), and to communicate the abnormality of the first CPU 61 to the second CPU 81.

The first inter-CPU communication section 67 is constituted by the first first inter-CPU communication section 67a and the second first inter-CPU communication section 67b of the dual system. Moreover, the first inter-CPU communication section 67 is configured to output a synchronous signal for synchronizing the respective control timings, to the second CPU 81 when the second CPU state judging section 74 judges that the second CPU 81 is returned (recovered) from the reset state, by the mutual monitoring.

The first inter-CPU communication diagnosis section 72 includes a first first inter-CPU communication diagnosis section 72a and a second first inter-CPU communication diagnosis section 72b. The first first inter-CPU communication diagnosis section 72a is configured to judge whether or not the first inter-CPU communication through the first first inter-CPU communication section 67a is the normal state or the abnormal state. The second first inter-CPU communication diagnosis section 72b is configured to judge whether or not the second inter-CPU communication through the second first inter-CPU communication section 67b is the normal state or the abnormal state.

When the second CPU reset state judging section 73 judges that the second CPU 81 is in the reset state based on a predetermined condition, the second CPU reset state judging section 73 is configured to output that information to the second CPU state judging section 74. Specifically, as described below, the second CPU reset state judging section 73 is configured to judge that the second CPU 81 is in the reset state when it is sensed that a voltage VB supplied from the battery BT is smaller than a predetermined value, and when the communication stop states of the first first inter-CPU communication diagnosis section 72a and the second first inter-CPU communication diagnosis section 72b are continued during a predetermined time period or more.

The second CPU state judging section 74 is configured to judge the state of the communication function of the first CPU 61 based on the diagnosis results of the first first inter-CPU communication diagnosis section 72a and the second first inter-CPU communication diagnosis section 72b. Moreover, the second CPU state judging section 74 is configured to judge whether or not the second CPU 81 is in the normal state or the abnormal state based on the information of the first inter-CPU communication and the second inter-CPU communication through the first first inter-CPU communication section 67a and the second first inter-CPU communication section 67b. That is, this judgment is performed when both of the diagnosis results of the first first inter-CPU communication diagnosis section 72a and the second first inter-CPU communication diagnosis section 72b are the normal state.

As to the specific judgment criterion of the normal state and the abnormal state of the second CPU 81, it is judged that the second CPU 81 is in the normal state when it is recognized that the respective inter-CPU communications (the first inter-CPU communication and the second inter-CPU communication) of the first first inter-CPU communication section 67a and the second first inter-CPU communication section 67b are in the normal state. On the other hand, it is judged that the second CPU 81 is in the abnormal state when it is recognized that the respective inter-CPU communications (the first inter-CPU communication and the second inter-CPU communication) of the first first inter-CPU communication section 67a and the second first inter-CPU communication section 67b are in the abnormal state. Moreover, when one of the inter-CPU communications (the first inter-CPU communication and the second inter-CPU communication) of the first first inter-CPU communication section 67a and the second first inter-CPU communication section 67b is in the normal state, and when the other of the inter-CPU communications is in the abnormal state, that is, when the judgments are different, it is judged that the other of the inter-CPU communications is in the abnormal state. Besides, for example, by sending a predetermined variable from the first first inter-CPU communication section 67a and the second first inter-CPU communication section 67b, it is possible to judge the normal state and the abnormal state of the second CPU 81 by whether or not the reception sides receive the same value.

The second CPU state judging section 74 is configured to continue or stop the driving control of the electric motor 4, or shift the driving control of the electric motor 4 to the output decreasing state in the first control section 60, and to show the warning to the vehicle side, if necessary, based on the reset state of the second CPU 81, the abnormal state of the second CPU 81, and the states of the first inter-CPU communication and the second inter-CPU communication through the first first inter-CPU communication section 67a and the second first inter-CPU communication section 67b.

The first command signal calculation section 75 is configured to calculate a first basic command signal Ib1 with reference to a predetermined assist control amount Map (not shown), based on torque signals obtained from the first and second first torque signal receiving sections T11 and T12 (cf. FIG. 3), and the vehicle speed signal obtained from the vehicle signal receiving section VS (cf. FIG. 3). Moreover, the first command signal calculation section 75 is configured to calculate a first control command signal Ic1 which is a command signal to control the first inverter circuit 62 when the second CPU state judging section 74 judges the abnormality of the inter-CPU communication. In this way, the first command signal calculating section 75 is configured to calculate a first command signal Io1 constituted by the first basic command signal Ib1, the first control command signal Ic1, and so on. The electric motor 4 is driven and controlled through the first inverter circuit 62 based on the first command signal Io1.

Moreover, when the second CPU state judging section 74 judges that the second CPU 81 is in the reset state, the first command signal calculation section 75 is configured to calculate a second command signal Io2 at least until the second CPU 81 is returned. That is, when it is judged that the second CPU 81 is in the reset state, the assist control is continued only by the first CPU 61 until the second CPU 81 is rebooted (restarted) and returned. Besides, after the second CPU 81 is returned, the both CPUs of the first CPU 61 and the second CPU 81 may continue the assist control. Moreover, the process may proceed to other control.

The first reset executing section 76 is configured to execute the reset of the first CPU 61 based on the first reset signal Rs1 inputted to the first reset signal receiving section R1 of the first CPU 61. This reset of the CPU is based on the function of the hardware of the first CPU 61. Moreover, when the second CPU state judging section 74 judges that the second CPU 81 is in the reset state, the first reset executing section 76 is configured to execute the reset of the first CPU 61 in accordance with the reset of the second CPU 81.

The second CPU 81 described below is similarly constituted. That is, the second CPU 81 includes a second CPU malfunction diagnosis section 91; a second inter-CPU communication section 87; a second inter-CPU communication diagnosis section 92; a first CPU reset state judging section 93; a first CPU state judging section 94; a second command signal calculation section 95; and a second reset executing section 96.

The second CPU malfunction diagnosis section 91 is configured to sense the abnormal state of the second CPU 81, and to output this information to the second CPU monitoring section 84. As described above, when it is judged that the abnormality is generated in the second CPU 81, the second CPU monitoring section 84 is configured to output the shutoff signal to the second fail safe relay 85 and the second inverter circuit 82 so as to shut off the electric power supply from the battery BT. Moreover, the second CPU malfunction diagnosis section 91 is configured to output the diagnosis result to the second inter-CPU communication section 87 (a first second inter-CPU communication section 87a and a second second inter-CPU communication section 87b described later), and to communicate the abnormality of the second CPU 81 to the first CPU 61.

The second inter-CPU communication section 87 is constituted by the first second inter-CPU communication section 87a and the second second inter-CPU communication section 87b of the dual system. Moreover, the second inter-CPU communication section 87 is configured to output a synchronous signal for synchronizing the respective control timings, to the first CPU 61 when the first CPU state judging section 94 judges that the first CPU 61 is returned (recovered) from the reset state, by the mutual monitoring.

The second inter-CPU communication diagnosis section 92 includes a first second inter-CPU communication diagnosis section 92a and a second second inter-CPU communication diagnosis section 92b. The first second inter-CPU communication diagnosis section 92a is configured to judge whether or not the first inter-CPU communication through the first second inter-CPU communication section 87a is the normal state or the abnormal state. The second second inter-CPU communication diagnosis section 92b is configured to judge whether or not the second inter-CPU communication through the second second inter-CPU communication section 87b is the normal state or the abnormal state.

When the first CPU reset state judging section 93 judges that the first CPU 61 is in the reset state based on a predetermined condition, the first CPU reset state judging section 93 is configured to output that information to the first CPU state judging section 94. Specifically, as described below, the first CPU reset state judging section 93 is configured to judge that the first CPU 61 is in the reset state when it is sensed that the voltage VB supplied from the battery BT is smaller than a predetermined value, and when the communication stop states of the first second inter-CPU communication diagnosis section 92a and the second second inter-CPU communication diagnosis section 92b are continued during a predetermined time period or more.

The first CPU state judging section 94 is configured to judge the state of the communication function of the second CPU 81 based on the diagnosis results of the first second inter-CPU communication diagnosis section 92a and the second second inter-CPU communication diagnosis section 92b. Moreover, the first CPU state judging section 94 is configured to judge whether or not the first CPU 61 is in the normal state or the abnormal state based on the information of the first inter-CPU communication and the second inter-CPU communication through the first second inter-CPU communication section 87a and the second second inter-CPU communication section 87b. That is, this judgment is performed when both of the diagnosis results of the first second inter-CPU communication diagnosis section 92a and the second second inter-CPU communication diagnosis section 92b are the normal state.

As to the specific judgment criterion of the normal state and the abnormal state of the first CPU 61, it is judged that the first CPU 61 is in the normal state when it is recognized that the respective inter-CPU communications (the first inter-CPU communication and the second inter-CPU communication) of the first second inter-CPU communication section 87a and the second second inter-CPU communication section 87b are in the normal state. On the other hand, it is judged that the first CPU 61 is in the abnormal state when it is recognized that the respective inter-CPU communications (the first inter-CPU communication and the second inter-CPU communication) of the first second inter-CPU communication section 87a and the second second inter-CPU communication section 87b are in the abnormal state. Moreover, when one of the inter-CPU communications (the first inter-CPU communication and the second inter-CPU communication) of the first second inter-CPU communication section 87a and the second second inter-CPU communication section 87b is in the normal state, and when the other of the inter-CPU communications is in the abnormal state, that is, when the judgments are different, it is judged that the other of the inter-CPU communications is in the abnormal state. Besides, for example, by sending a predetermined variable from the first second inter-CPU communication section 87a and the second second inter-CPU communication section 87b, it is possible to judge the normal state and the abnormal state of the first CPU 61 by whether or not the reception sides receive the same value.

The first CPU state judging section 94 is configured to continue or stop the driving control of the electric motor 4, or shift the driving control of the electric motor 4 to the output decreasing state in the second control section 80, and to show the warning to the vehicle side, if necessary, based on the reset state of the first CPU 61, the abnormal state of the first CPU 61, and the states of the first inter-CPU communication and the second inter-CPU communication through the first second inter-CPU communication section 87a and the second second inter-CPU communication section 87b.

The second command signal calculation section 95 is configured to calculate a second basic command signal Ib2 with reference to a predetermined assist control amount Map (not shown), based on torque signals obtained from the first and second second torque signal receiving sections T21 and T22 (cf. FIG. 3), and the vehicle speed signal obtained from the vehicle signal receiving section VS (cf. FIG. 3). Moreover, the second command signal calculation section 95 is configured to calculate a second control command signal Ic2 which is a command signal to control the second inverter circuit 82 when the first CPU state judging section 94 judges the abnormality of the inter-CPU communication. In this way, the second command signal calculating section 95 is configured to calculate a second command signal Io2 constituted by the second basic command signal Ib2, the second control command signal Ic2, and so on. The electric motor 4 is driven and controlled through the second inverter circuit 82 based on the second command signal Io2.

Moreover, when the first CPU state judging section 94 judges that the first CPU 61 is in the reset state, the second command signal calculation section 95 is configured to calculate a second command signal Io2 at least until the first CPU 61 is returned. That is, when it is judged that the first CPU 81 is in the reset state, the assist control is continued only by the second CPU 81 until the first CPU 61 is rebooted (restarted) and returned. Besides, after the first CPU 61 is returned, both CPUs of the first CPU 61 and the second CPU 81 may continue the assist control. Moreover, the process may proceed to other control.

The second reset executing section 96 is configured to execute the reset of the second CPU 81 based on the second reset signal Rs2 inputted to the second reset signal receiving section R2 of the second CPU 81. This reset of the CPU is based on the function of the hardware of the second CPU 81. Moreover, when the first CPU state judging section 94 judges that the first CPU 61 is in the reset state, the second reset executing section 96 is configured to execute the reset of the second CPU 81 in accordance with the reset of the first CPU 61.

Figure 5:
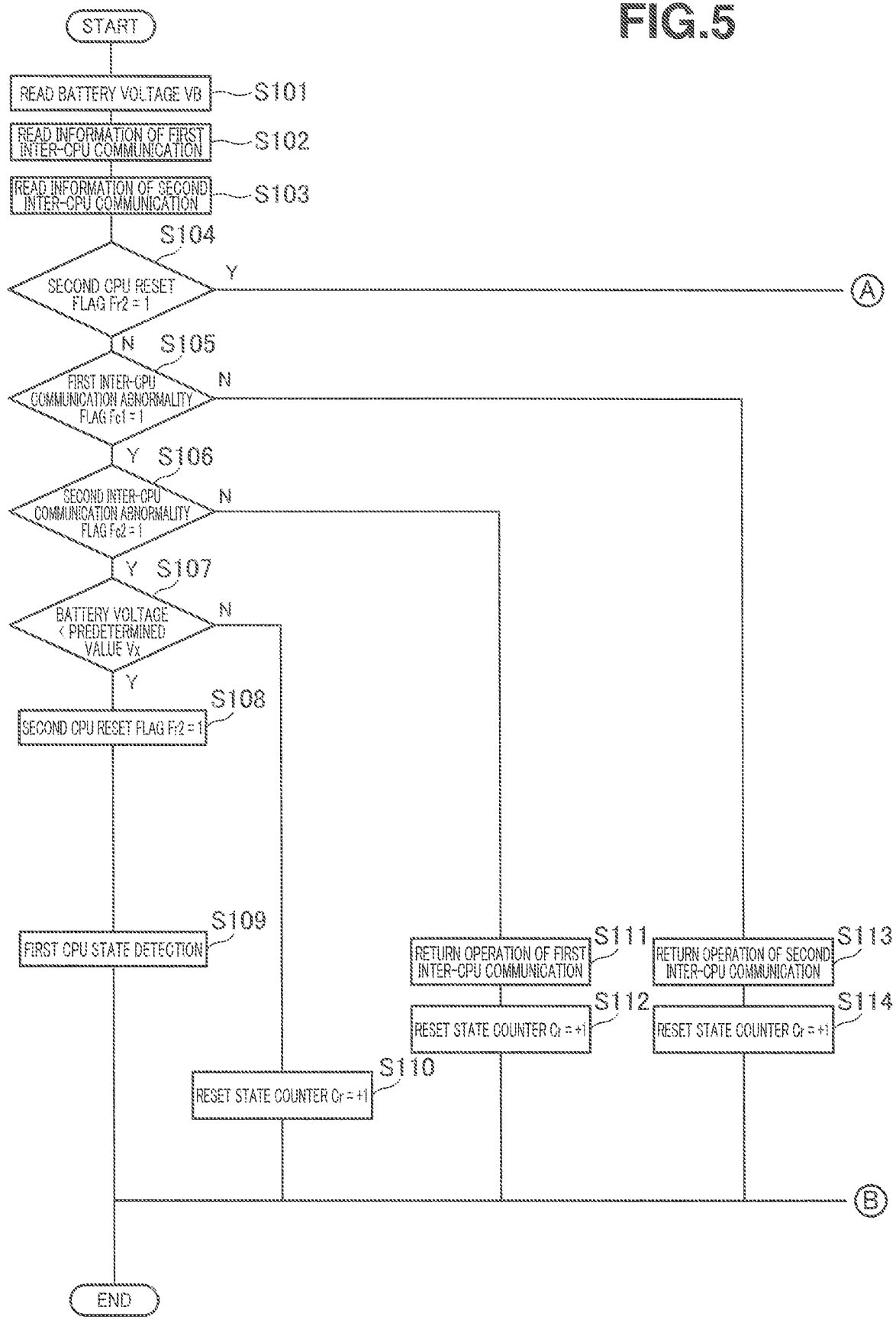
FIG. 5 is a flowchart showing control contents of a first CPU state judging section and a second CPU state judging section shown in FIG. 4.
Figure 6:
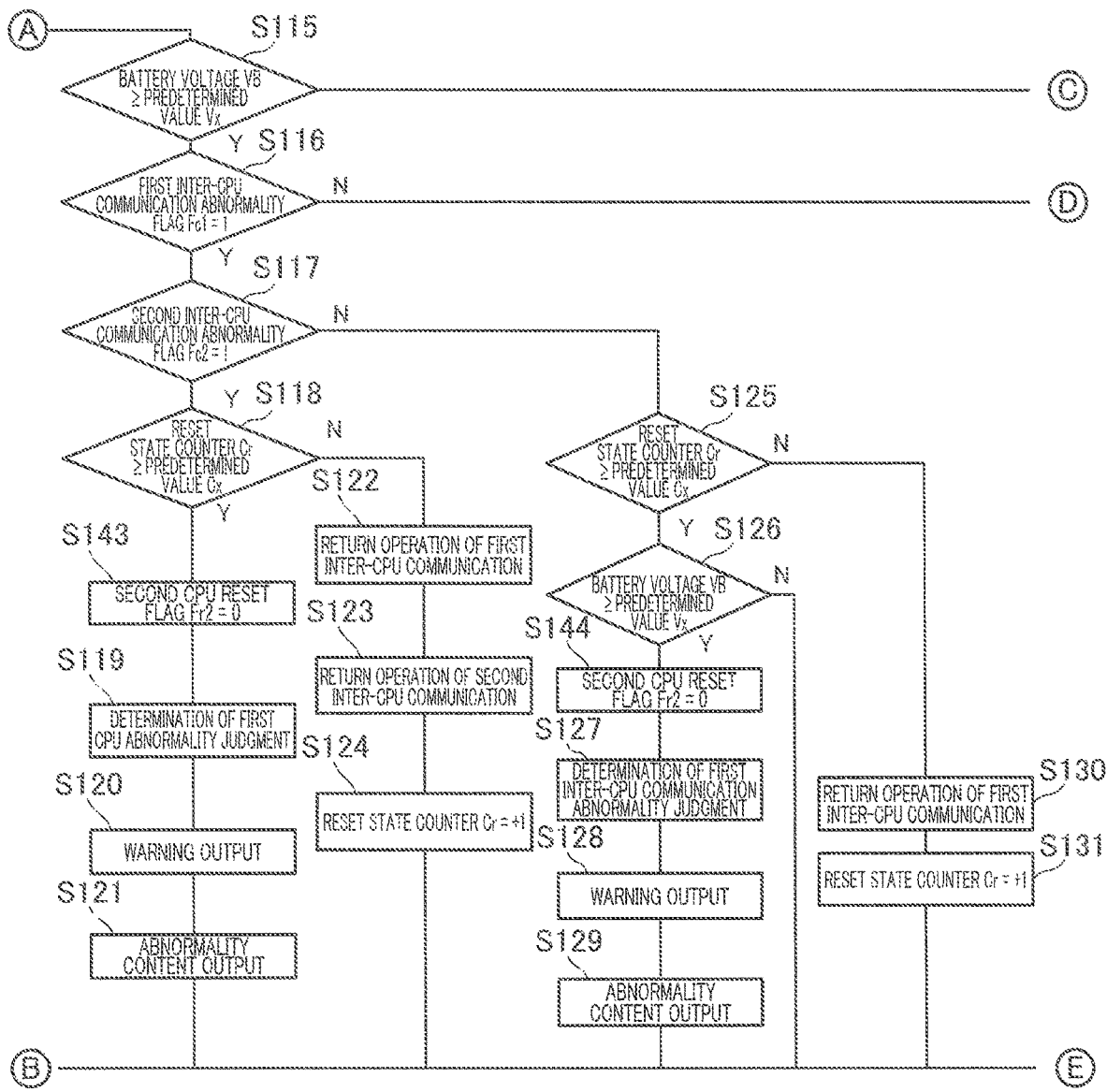
FIG. 6 is a flowchart showing control contents of the first CPU state judging section and the second CPU state judging section shown in FIG. 4.
Figure 7:
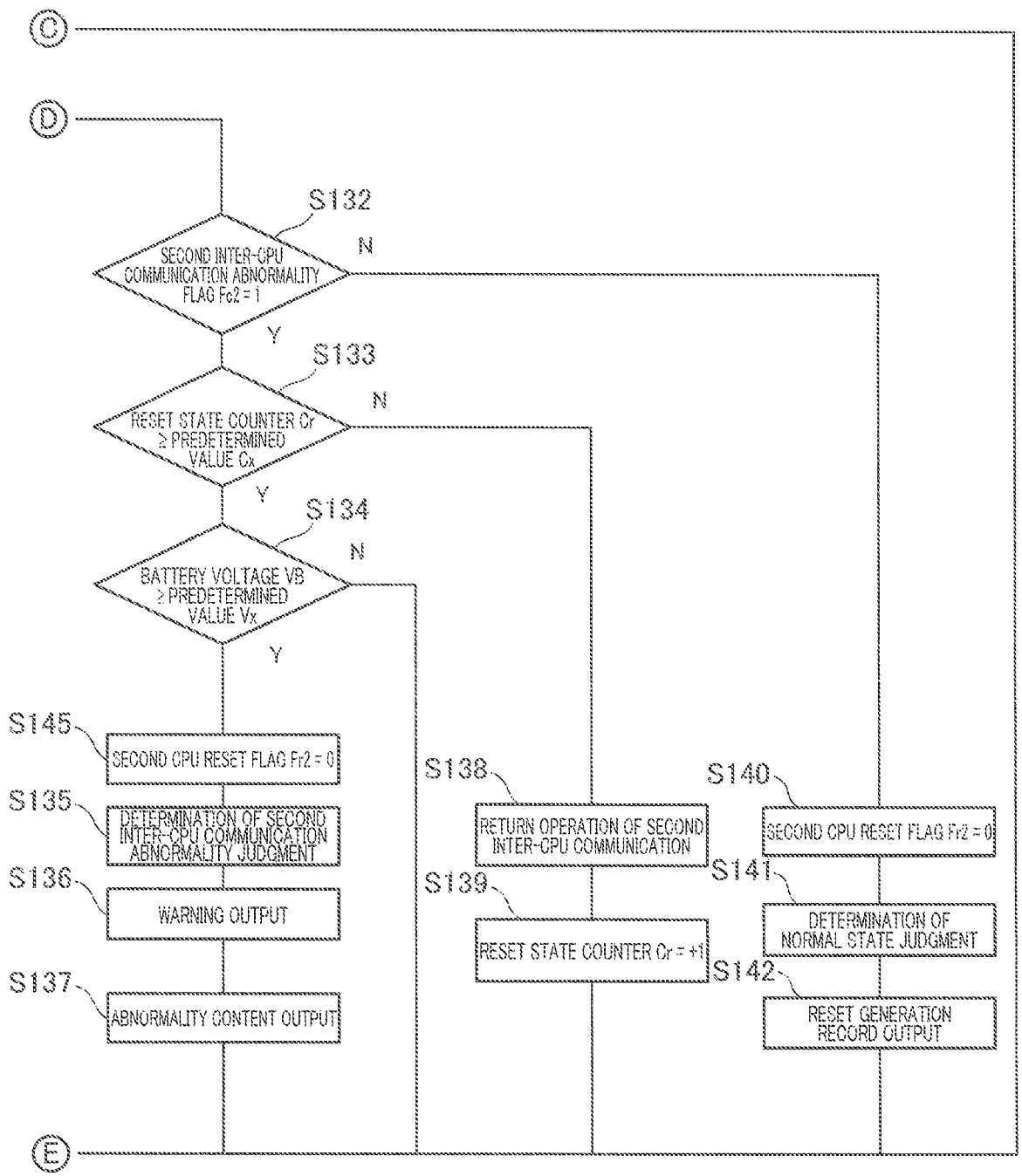
FIG. 7 is a flowchart showing control contents of the first CPU state judging section and the second CPU state judging section shown in FIG. 4.

FIG. 5 to FIG. 7 show a sequential flowchart showing control contents of the first CPU state judging section 94 and the second CPU state judging section 74. The control contents of the second CPU state judging section 74 are common with the control contents of the first CPU state judging section 94. Accordingly, the only control contents of the second CPU state judging section 74 are explained hereinafter. Concrete explanations of the control contents of the first CPU state judging section 94 are omitted.

As shown in FIG. 5, in this control flow, firstly, the battery voltage VB is read (step S101). Then, the information of the first inter-CPU communication is read (step S102). Moreover, the information of the second inter-CPU communication is read (step S103).

Next, it is judged whether or not a reset flag Fr2 of the other of CPUs (the second CPU 81 in this embodiment) is set (step S104). In case of the judgment of Yes, the process proceeds to step S115.

On the other hand, in case of the judgment of No at step S104, it is judged whether or not the abnormality of the first inter-CPU communication, that is, the first inter-CPU communication abnormality flag Fc1 is set (step S105). Besides, concrete contents of this abnormality judgment of the first inter-CPU communication are explained later with reference to a sub flowchart shown in FIG. 8 (hereinafter, this is identical in this control flow).

In case of the judgment of No at step S105, the return operation of the second inter-CPU communication is performed (step S113). Then, a reset state counter Cr is incremented (step S114). This program is finished. Besides, the return operation of the second inter-CPU communication is, for example, by the initialization of the predetermined RAM, the synchronization of the communication cycle, and so on (hereinafter, this is identical in this control flow).

On the other hand, in case of the judgment of Yes at step S105, it is judged whether or not the abnormality of the second inter-CPU communication, that is, the second inter-CPU communication abnormality flag Fc2 is set (step S106). Besides, the abnormality judgment of this second inter-CPU communication is identical to the abnormality judgment of the first inter-CPU communication (hereinafter, this is identical in this control flow).

In case of the judgment of No at step S106, the return operation of the first inter-CPU communication is performed (step S111). Then, the reset state counter Cr is incremented (step S112). This program is finished. Besides, the return operation of the first inter-CPU communication is, for example, by the initialization of the predetermined RAM, the synchronization of the communication cycle, and so on (hereinafter, this is identical in this control flow).

On the other hand, in case of the judgment of Yes at step S106, it is judged whether or not the battery voltage VB is smaller than a predetermined value Vx (step S107). In this case, in case of the judgment of No, the reset state counter Cr is incremented (step S110). This program is finished. Besides, in this embodiment, the predetermined value Vx is set to "5 to 6 volts".

On the other hand, in case of the judgment of Yes at step S107, the reset signal is outputted. That is, the reset flag Fr2 is set (step S108). Then, the state of the own CPU (the first CPU 61 in this embodiment) is sensed (step S109). This program is finished. In this way, in this embodiment, the reset state of the second CPU 81 is judged based on the information of the battery voltage VB and the first inter-CPU communication.

Next, in case of the judgment of Yes at step S104, it is judged whether or not the battery voltage VB is equal to or greater than the predetermined value Vx (step S115), as shown in FIG. 6. In case of the judgment of No at step S115, this program is finished.

On the other hand, in case of the judgment of Yes at step S115, it is judged whether or not the first inter-CPU communication abnormality flag Fc1 is set (step S116), similarly to the step S105. In this case, in case of the judgment of No, the process proceeds to step S132.

On the other hand, in case of the judgment of Yes at step S116, it is judged whether or not the second inter-CPU communication abnormality flag Fc2 is set (step S117), similarly to step S106. In this case, in case of the judgment of No, it is judged whether or not the reset state counter Cr is equal to or greater than the predetermined value Cx (step S125). Besides, the reset state counter Cr is a timer counter. In this embodiment, the predetermined value Cx is set to "1 second".

In case of the judgment of No at step S125, the return operation of the first inter-CPU communication is performed (step S130). Then, the reset state counter Cr is incremented (step S131). This program is finished.

On the other hand, in case of the judgment of Yes at step S125, it is judged whether or not the battery voltage VB is equal to or greater than the predetermined value Vx (step S126). In case of the judgment of No at step S126, this program is finished.

In case of the judgment of Yes at step S126, the reset flag Fr2 is canceled (step S144). Then, the abnormality judgment of the first inter-CPU communication is determined (step S127). The assist control is continued. Then, the warning of the abnormality of the first inter-CPU communication is outputted (step S128). The contents of the abnormality are outputted (step S129). This program is finished. In this case, the assist control may be continued unchanged. Moreover, the assist control may be continued, for example, by decreasing the output of the electric motor 4 (hereinafter, this is identical in this control flow).

Moreover, in case of the judgment of Yes at step S117, it is judged whether or not the reset state counter Cr is equal to or greater than the predetermined value Cx (step S118).

In this case, in case of the judgment of No, the return operation of the first inter-CPU communication is performed (step S122). The return operation of the second inter-CPU communication is performed (step S123). Then, the reset state counter Cr is incremented (step S124). This program is finished.

On the other hand, in case of the judgment of Yes at step S118, the reset flag Fr2 is canceled (step S143). Then, the abnormality judgment of the own first CPU is determined (step S119). The assist control is continued. Then, the abnormality of the own first CPU is outputted (step S120). The contents of the abnormality are outputted (step S121). This program is finished.

Next, in case of the judgment of No at step S116, it is judged whether or not the second inter-CPU communication abnormality flag Fc2 is set, as shown in FIG. 7. In this case, in case of the judgment of No, the reset flag Fr2 is canceled (step S140). Then, the normal state judgment of the first CPU is determined (step S141). Then, the reset generation record is outputted (step S142). This program is finished.

On the other hand, in case of the judgment of Yes at step S132, it is judged whether or not the reset state counter Cr is equal to or greater than the predetermined value Cx (step S133). In this case, in case of the judgment of No, the return operation of the second inter-CPU communication is performed (step S138). Then, the reset state counter Cr is incremented (step S139). This program is finished.

On the other hand, in case of the judgment of Yes at step S133, it is judged whether or not the battery voltage VB is equal to or greater than the predetermined value Vx (step S134). In case of the judgment of No, this program is finished.

In case of the judgement of Yes at step S134, the reset flag Fr2 is canceled (step S145). The abnormality judgment of the second inter-CPU communication is determined (step S135). This assist control is continued. Then, the warning of the abnormality of the second inter-CPU communication is outputted (step S136). The contents of the abnormality are outputted (step S137). This program is finished.

Figure 8:
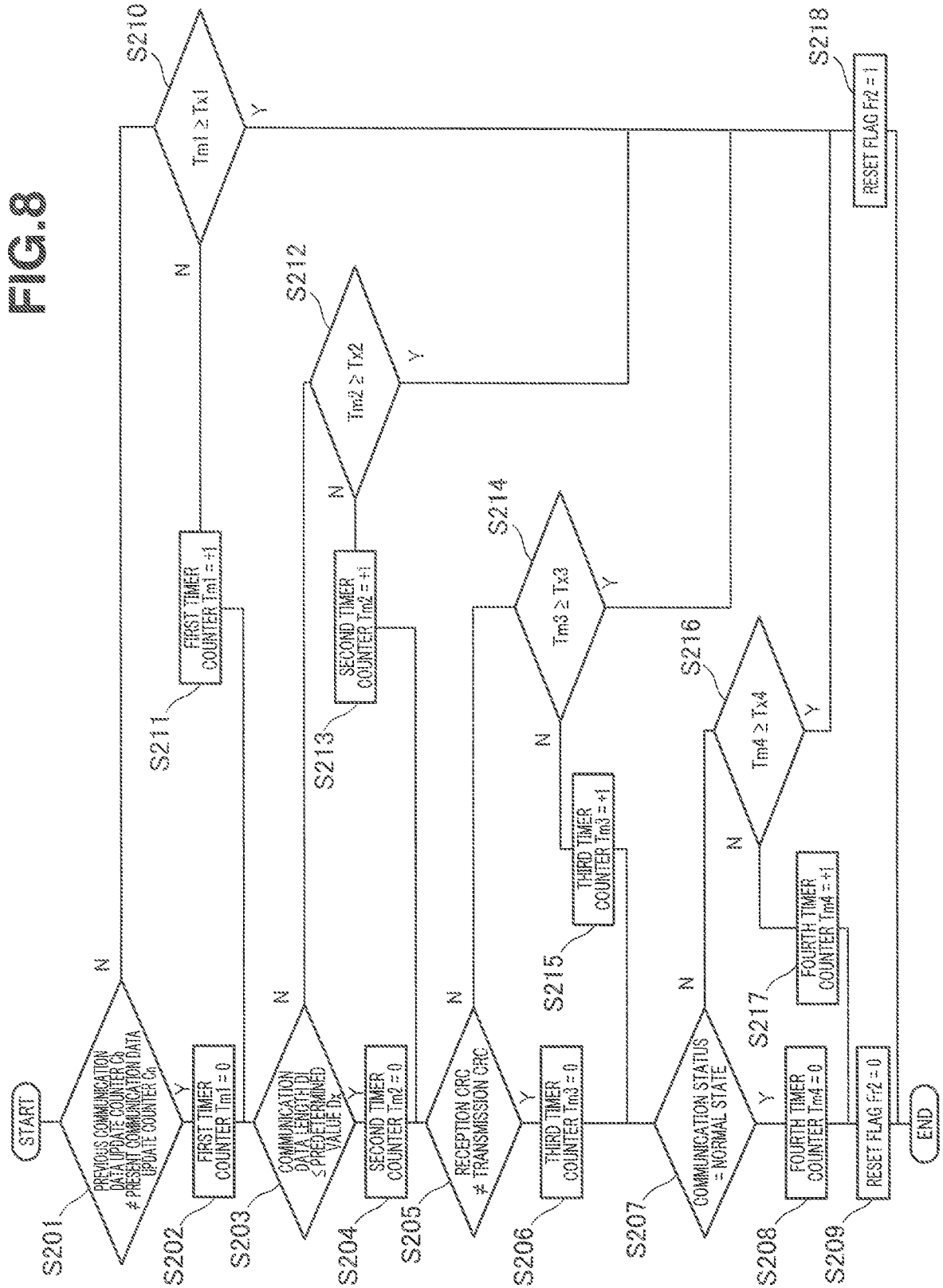
FIG. 8 is a flowchart showing control contents of an abnormality judgment of an inter-CPU communication shown in FIG. 5 to FIG. 7.

FIG. 8 is a flowchart showing the control contents of the abnormality judgments of the first inter-CPU communication and the second inter-CPU communication. In this case, the abnormality judgment of the first inter-CPU communication is common with the abnormality judgment of the second inter-CPU communication. Accordingly, the only abnormality judgment of the second inter-CPU communication is explained below. The concrete explanation of the abnormality judgment of the first inter-CPU communication is omitted.

As shown in FIG. 8, in this control flow, firstly, it is judged whether or not the previous communication data update counter Cb does not correspond to the present communication data update counter Cn (step S201).

In this case, in case of the judgment of No, the data is not updated (renewed). Next, it is judged whether or not the first timer counter Tm1 is equal to or greater than the predetermined value Tx1 (step S210). In case of the judgment of Yes, the reset flag Fr2 is set (step S218). The abnormality state of the second inter-CPU communication is determined. This program is finished.

On the other hand, in case of the judgment of No at step S210, the first timer counter Tm1 is incremented (step S211). The process proceeds to step S203.

Moreover, in case of the judgment of Yes at step S201, the first timer counter Tm1 is cleared (step S202). Then, the process proceeds to step S203.

At step S203, it is judged whether or not a communication data length Di is equal to or smaller than a predetermined value Dx (step S203).

In this case, in case of the judgment of No, the data length is in the abnormal state. Next, it is judged whether or not the second timer counter Tm2 is equal to or greater than the predetermined value Tx2 (step S212). In case of the judgment of Yes, the reset flag Fr2 is set (step S218). The abnormal state of the second inter-CPU communication is determined. This program is finished.

On the other hand, in case of the judgment of No at step S212, the second timer counter Tm2 is incremented (step S213). The process proceeds to step S205.

Moreover, in case of the judgment of Yes at step S203, the second timer counter Tm2 is cleared (step S204). Then, the process proceeds to step S205.

At step S205, it is judged whether or not the reception CRC and the transmission CRC correspond to each other.

In this case, in case of the judgment of No, the data is garbled (corrupted). Next, it is judged whether or not the third timer counter Tm3 is equal to or greater than the predetermined value Tx3 (step S214). In case of the judgment of Yes, the rest flag Fr2 is set (step S218). The abnormal state of the second inter-CPU communication is determined. This program is finished.

On the other hand, in case of the judgment of No at step S214, the third timer counter Tm3 is incremented (step S215). The process proceeds to step S207.

Moreover, in case of the judgment of Yes at step S205, the third timer counter Tm3 is cleared (step S206). The process proceeds to step S207.

At step S207, it is judged whether or not the communication status is in the normal state (step S207).

In this case, in case of the judgment of No, the self-diagnosis of the communication is N.G. Next, it is judged whether or not the fourth timer counter Tm4 is equal to or greater than the predetermined value Tx4 (step S216). In case of the judgment of Yes, the reset flag Fr2 is set (step S218). The abnormal state of the second inter-CPU communication is determined. This program is finished.

On the other hand, in case of the judgment of No at step S216, the fourth timer counter Tm4 is incremented (step S217). The process proceeds to step S209.

Moreover, in case of the judgment of Yes at step S207, the fourth timer counter Tm4 is cleared (step S208). The process proceeds to step S209.

At step S209, the reset flag Fr2 is canceled (step S209). The normal state of the second inter-CPU communication is determined. This program is finished.

Operations and Effects of this Embodiment

In a case where the first CPU and the second CPU are constantly reset at the same time like the conventional control device of the vehicle-mounted apparatus (the electric power steering device), there is a problem that the assist control of the electric power steering device cannot intervened during the reset.

On the other hand, in a case where the only one of the CPUs which is needed to be reset is reset, the inter-CPU communication is shut off. Accordingly, it is not possible to appropriately judge the operation state of the one of the CPUs from the other of the CPUs which is not in the reset state. That is, in the one of the CPUs in which the inter-CPU communication is shut off, it is difficult to judge whether or not the one of the CPUs is in the reset state, or to judge whether or not the CPU itself or the inter-CPU communication is in the abnormal state. This is an obstacle for the subsequent appropriate control.

Contrary to this, the control device of the vehicle-mounted apparatus according to this embodiment can attain below-described effects. Accordingly, it is possible to dissolve the problems of the conventional control device of the vehicle-mounted apparatus.

That is, a control device (control device 5) for a vehicle-mounted apparatus according to the embodiment, the control device includes: a first CPU 61 and a second CPU 81 which are configured to calculate command signals (a first command signal Io1 and a second command signal Io2) to control an electric motor 4 which is a driving section of the vehicle-mounted apparatus which is a power steering apparatus; a first reset section 66 configured to output a first reset signal Rs1 to the first CPU 61; a second reset section 86 configured to output a second reset signal Rs2 to the second CPU 81; a first inter-CPU communication section 67 provided to the first CPU 61, and configured to perform an inter-CPU communication which is a communication of a signal between the first CPU 61 and the second CPU 81; a second inter-CPU communication section 87 provided to the second CPU 81, and configured to perform the inter-CPU communication; a first electric power supply section 63 configured to supply an electric power to the first CPU 61; a second electric power supply section 83 configured to supply an electric power to the second CPU 81; a second CPU state judging section 74 provided to the first CPU 61, and configured to judge a state of the second CPU 81 based on a state of the inter-CPU communication and a voltage value (battery voltage VB) of the electric power supplied from the first electric power supply section 63, or the second reset signal Rs; and a first CPU state judging section 94 provided to the second CPU 81, and configured to judge a state of the first CPU 61 based on the state of the inter-CPU communication and a voltage value (battery voltage VB) of the electric power supplied from the second electric power supply section 83, or the first reset signal Rs1.

In this way, in this embodiment, when the inter-CPU communication is in the abnormal state (the inter-CPU communication cannot be performed (is disable), or the inter-CPU communication is stopped) in one of the first CPU 61 and the second CPU 81, and when the battery voltage VB is smaller than the predetermined value Vx, it is judged that one of the CPUs is in the reset state. With this, it is possible to appropriately perform the subsequent process in the other of the CPUs.

Moreover, in this embodiment, the first CPU state judging section 94 is configured to judge that the first CPU 81 is in an abnormal state when the inter-CPU communication is stopped or cannot be performed, when the voltage value (battery voltage VB) of the electric power supplied from the second electric power supply section 83 is equal to or greater than a predetermined value Vx, and when the first reset signal Rs1 is not outputted; and the second CPU state judging section 74 is configured to judge that the second CPU 81 is in an abnormal state when the inter-CPU communication is stopped or cannot be performed, when the voltage value (battery voltage VB) of the electric power supplied from the first electric power supply section 63 is equal to or greater than a predetermined value Vx, and when the second reset signal Rs is not outputted.

In this way, in a case where the inter-CPU communication in the abnormal state (cannot be performed or is stopped) when the battery voltage VB is in the normal state, and when the first reset signal Rs1 and the second reset signal Rs2 are not outputted, it is judged that the CPU is not in the reset state, and that the CPU itself is in the abnormal state. With this, it is possible to appropriately perform the subsequent process.

Moreover, in this embodiment, the first CPU state judging section 94 is configured to judge whether or not the first CPU 61 is in the abnormal state based on the signal transferred from the first CPU 61 when the inter-CPU communication can be performed; and the second CPU state judging section 74 is configured to judge whether or not the second CPU 81 is in the abnormal state based on the signal transferred from the second CPU 81 when the inter-CPU communication can be performed.

In this way, when the inter-CPU communication can be performed, the judgment is performed based on the information of the inter-CPU communication. With this, it is possible to reflect the result of the self-diagnosis function (cf. step S109) of the respective CPUs 61 and 81 to the counterpart CPU, and to appropriately perform the subsequent process.

Moreover, in this embodiment, the first CPU 61 includes a first command signal calculation section 75 configured to calculate a command signal Io1 to control the electric motor 4 which is the driving section; the second CPU 81 includes a second command signal calculation section 95 configured to calculate a command signal Io2 to control the electric motor 4 which is the driving section; the first command signal calculation section 75 is configured to calculate the command signal (first command signal Io1) to control the electric motor 4 which is the driving section when the second CPU state judging section 74 judges that the second CPU 81 is in the abnormal state; and the second command signal calculation section 95 is configured to calculate the command signal (second command signal Io2) to control the electric motor 4 which is the driving section when the first CPU state judging section 94 judges that the first CPU 61 is in the abnormal state.

In this way, when it is judged that one of the first CPU 61 and the second CPU 81 is in the abnormal state, the assist control is continued by the other of the CPUs (cf. steps S119 to S120). With this, it is possible to improve the convenience of the driver.

Moreover, in this embodiment, the control device includes a first CPU monitoring section 64 configured to judge whether or not the first CPU 61 is in the abnormal state, and a second CPU monitoring section 84 configured to judge whether or not the second CPU 81 is in the abnormal state;

the first CPU state judging section 94 is configured to judge whether the first CPU 61 is in the abnormal state when the inter-CPU communication cannot be performed, and the voltage value (battery voltage VB) of the electric power supplied from the second electric power supply section is equal to or greater than a predetermined value Vx, or when the first CPU monitoring section judges that the first CPU 61 is in the abnormal state; and the second CPU state judging section 74 is configured to judge whether the second CPU 81 is in the abnormal state when the inter-CPU communication cannot be performed, and the voltage value (battery voltage VB) of the electric power supplied from the first electric power supply section 63 is equal to or greater than a predetermined value Vx, or when the second CPU monitoring section 84 judges that the second CPU 81 is in the abnormal state.

Specifically, in this embodiment, when the first and second CPU state judging sections 74 and 94 judges that the inter-CPU communication cannot be performed, and when the battery voltage VB supplied from the first and second electric power supply sections 63 and 83 is equal to or greater than the predetermined value Vx, it is possible to judge that one of the CPUs is in the abnormal state. With this, it is possible to appropriately perform the subsequent process in the other of the CPUs.

Moreover, in this embodiment, the first CPU 61 includes a first command signal calculation section 75 configured to calculate the first control signal Io1 which is the command signal to control the electric motor 4 which is the driving section; the second CPU 81 includes a second command signal calculation section configured to calculate the second control signal Io2 which is the command signal to control the electric motor 4 which is the driving section; the first command signal calculation section 75 is configured to calculate the command signal (first command signal Io1) to control the electric motor 4 which is the driving section when the second CPU state judging section 74 judges that the second CPU 81 is in the abnormal state; and the second command signal calculation section 95 is configured to calculate the command signal (second command signal Io2) to control the electric motor 4 which is the driving section when the first CPU state judging section 94 judges that the first CPU 61 is in the abnormal state.

In this way, when it is judged that one of the first CPU 61 and the second CPU 81 is in the abnormal state, the assist control is continued by the other of the CPUs (steps S119 to S120). With this, it is possible to improve the convenience of the driver.

Moreover, in this embodiment, the first inter-CPU communication section 67 includes a first first inter-CPU communication section 67a and a second first inter-CPU communication section 67b; and the second inter-CPU communication section 87 includes a first second inter-CPU communication section 87a configured to perform a first inter-CPU communication between the first second inter-CPU communication section 87a and the first first inter-CPU communication section 67a, and a second second inter-CPU communication section 87b configured to perform a second inter-CPU communication between the second first inter-CPU communication section 67b and the second second inter-CPU communication section 87b.

In this way, the first and second inter-CPU communication sections 67 and 77 are constituted by the redundant system. With this, it is possible to improve the reliability of the control device 5.

Moreover, in this embodiment, the control device includes a first CPU monitoring section 64 configured to judge whether or not the first CPU 61 is in the abnormal state, and a second CPU monitoring section 84 configured to judge whether or not the second CPU 81 is in the abnormal state;

the first CPU state judging section 94 is configured to judge whether the first CPU 61 is in the abnormal state when the first inter-CPU communication and the second inter-CPU communication cannot be performed, and the voltage value (battery voltage VB) of the electric power supplied from the second electric power supply section 83 is equal to or greater than the predetermined value Vx, or when the first CPU monitoring section 64 judges that the first CPU 61 is in the abnormal state, and the first inter-CPU communication and the second inter-CPU communication cannot be performed; and the second CPU state judging section 74 is configured to judge whether the second CPU 81 is in the abnormal state when the first inter-CPU communication and the second inter-CPU communication cannot be performed, and the voltage value (battery voltage VB) of the electric power supplied from the first electric power supply section 63 is equal to or greater than the predetermined value Vx, or when the second CPU monitoring section 84 judges that the second CPU 81 is in the abnormal state, and the first inter-n CPU communication and the second inter-CPU communication cannot be performed.

Specifically, in this embodiment, when the first and second CPU state judging sections 74 and 94 judges that the inter-CPU communication cannot be performed, and when the battery voltage VB supplied from the first and second electric power supply sections 63 and 83 is equal to or greater than the predetermined value Vx, it is possible to judge that one of the CPUs is in the abnormal state. With this, it is possible to appropriately perform the subsequent process in the other of the CPUs.

Moreover, in this embodiment, the first CPU state judging section 94 is configured to judge that the first CPU 61 is in the reset state when the first inter-CPU communication and the second inter-CPU communication cannot be performed, and the voltage value (battery voltage VB) of the electric power supplied from the second electric power supply section 83 is smaller than the predetermined value Vx; and the second CPU state judging section 74 is configured to judge that the second CPU 81 is in the reset state when the first inter-CPU communication and the second inter-CPU communication cannot be performed, and the voltage value (battery voltage VB) of the electric power supplied from the first electric power supply section 63 is smaller than the predetermined value Vx.

In this way, when the first and second CPU state judging sections 74 and 94 judges that the inter-CPU communication cannot be performed, and when the battery voltage VB supplied from the first and second electric power supply sections 63 and 83 is smaller than the predetermined value Vx, it is possible to judge that one of the CPUs is in the reset state. With this, it is possible to appropriately perform the subsequent process in the other of the CPUs.

Moreover, in this embodiment, when one of the first inter-CPU communication and the second inter-CPU communication can be performed, and the other of the first inter-CPU communication and the second inter-CPU communication cannot be performed, the first CPU state judging section 94 or the second CPU state judging section 74 is configured to judge that the other of the first inter-CPU communication and the second inter-CPU communication is in the abnormal state.

In this way, when the first and second CPUs 61 and 81 are in the abnormal state or in the reset state, both of the first and second inter-CPU communications cannot be performed. However, when only one of the first and second inter-CPU communications cannot be performed, it is possible to judge that the inter-CPU communication is in the abnormal state. With this, it is possible to appropriately perform the subsequent process.

Moreover, in this embodiment, the first inter-CPU communication section 67 and the second inter-CPU communication section 87 have different communication types.

In this way, the first inter-CPU communication section 67 and the second inter-CPU communication section 87 have different communication types. With this, it is possible to suppress the simultaneous malfunctions of the first inter-CPU communication section 67 and the second inter-CPU communication section 87 due to the common cause.

Moreover, in this embodiment, the first CPU 61 includes a first command signal calculation section 75 configured to calculate the first control signal Io1 which is the command signal to control the electric motor 4 which is the driving section; the second CPU 81 includes a second command signal calculation section configured to calculate a command signal which is the second command signal to control the electric motor 4 which is the driving section; when the second CPU state judging section 74 judges that the second CPU 81 is in the reset state, the first command signal calculation section 75 is configured to calculate the command signal to control the driving section at least until the second CPU 81 is returned; and when the first CPU state judging section 94 judges that the first CPU 61 is in the reset state, the second command signal calculation section 95 is configured to calculate the command signal to control the driving section at least until the first CPU 61 is returned.

In this way, when it is judged that one of the CPUs is in the reset state, the assist control is continued by the other of the CPUs until the one of the CPUs is rebooted and returned. With this, it is possible to improve the convenience of the driver.

Moreover, in this embodiment, the first CPU 61 is configured to reset the first CPU 61 when the second CPU state judging section 74 judges that the second CPU 81 is in the reset state; and the second CPU 81 is configured to reset the second CPU 81 when the first CPU state judging section 94 judges that the first CPU 61 is in the reset state.

In this way, when it is judged that one of the CPUs is in the reset state, the own CPU is reset. With this, it is possible to stably drive the both CPUs.

Moreover, in this embodiment, after one of the first CPU 61 and the second CPU 81 is returned from the reset state, the other of the first CPU 61 and the second CPU 81 is configured to output a synchronous signal to synchronize a control timing to the one of the first CPU 61 and the second CPU 81 which was returned.

In this way, in accordance with the reset of the CPU, the synchronous signal is outputted to the CPU returned from the reset. With this, it is possible to synchronize the cycles which are deviated due to the reset.

(Variation)

Figure 9:
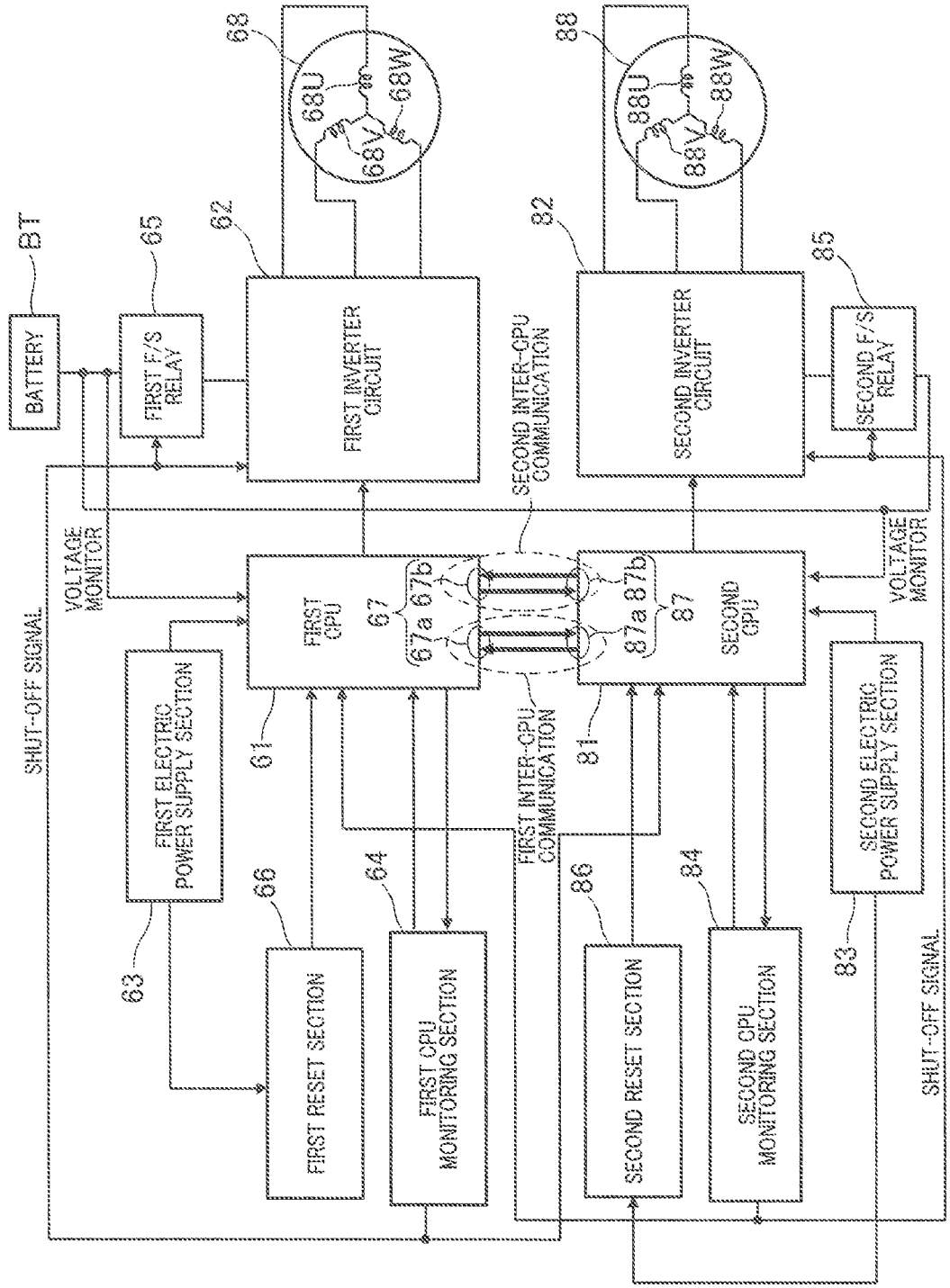
FIG. 9 is a system configuration view showing a control device for a vehicle-mounted apparatus according to a variation of the first embodiment of the present invention.
Figure 10:
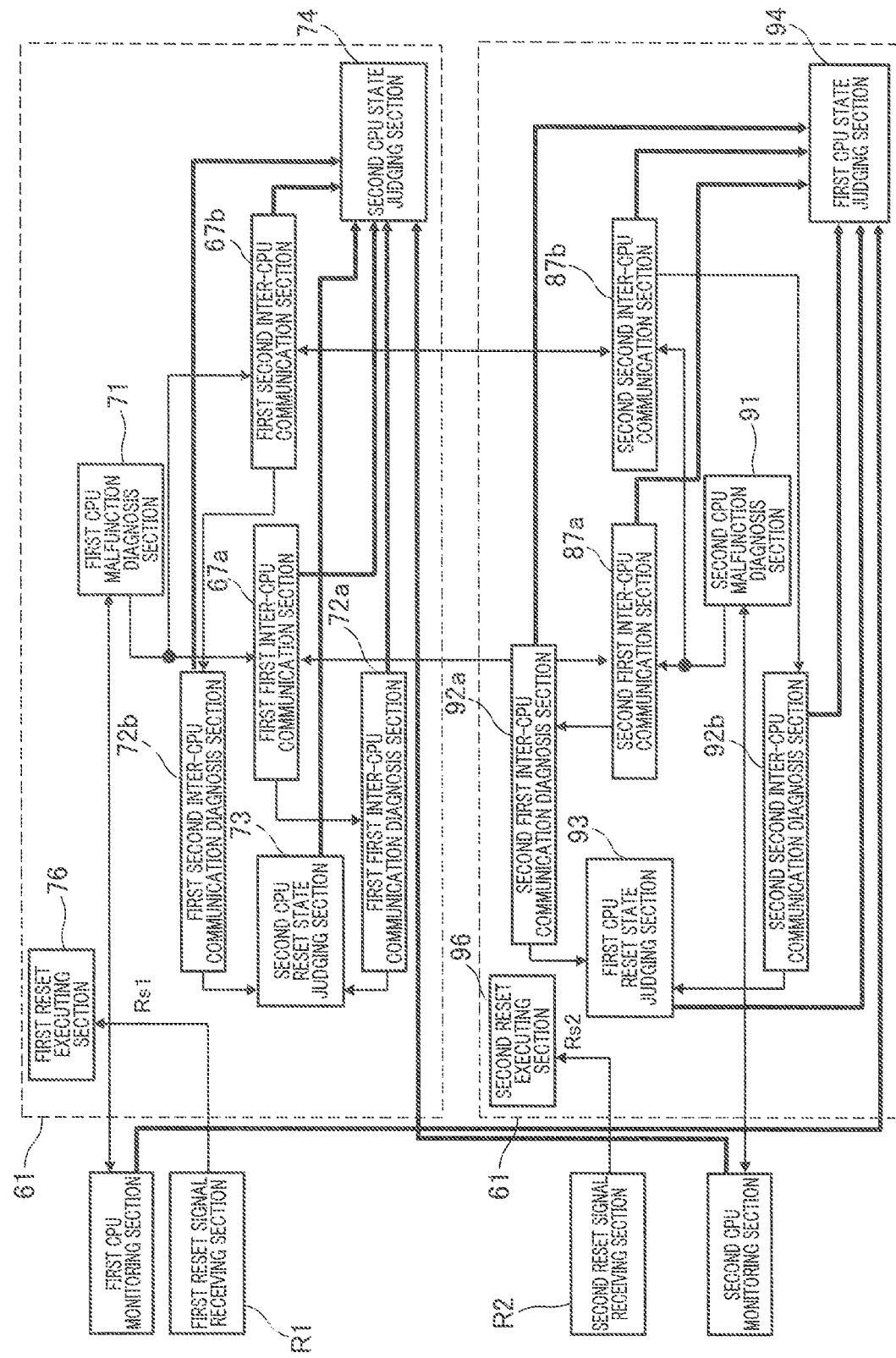
FIG. 10 is a block diagram showing a first CPU state judging section and a second CPU state judging section shown in FIG. 9.

FIG. 9 and FIG. 10 show a control device of a vehicle-mounted apparatus according to a variation of the first embodiment of the present invention. In this variation, the information from one of the CPU monitoring sections is directly inputted to the other of the CPUs. This variation has other configurations identical to those of the first embodiment. Accordingly, the configurations identical to those of the first embodiment have the same symbols. That explanations are omitted.

FIG. 9 is a system configuration view of the control device 5. FIG. 10 is a control block diagram showing the first CPU 61 and the second CPU 81.

In this variation, as shown in FIG. 9 and FIG. 10, the abnormality judgment information of the second CPU 81 outputted from the second CPU monitoring section 84 is directly inputted to the second CPU state judging section 74 of the first CPU 61. The abnormality judgment information of the second CPU 61 outputted from the first CPU monitoring section 64 is directly inputted to the first CPU state judging section 94 of the second CPU 81.

That is, in this variation, the second CPU state judging section 74 directly receives the abnormality judgment information from the second CPU monitoring section 84. When the second CPU monitoring section 84 judges that the second CPU 81 is in the abnormal state, the second CPU state judging section 74 judges that the second CPU 81 is in the abnormal state, based on the abnormality judgment information from the second CPU monitoring section 84. On the other hand, the first CPU state judging section 94 directly receives the abnormality judgment information from the first CPU monitoring section 64. When the first CPU monitoring section 64 judges that the first CPU 61 is in the abnormal state, the first CPU state judging section 94 judges that the first CPU 61 is in the abnormal state, based on the abnormality judgment information from the first CPU monitoring section 64.

Specifically, when the first inter-CPU communication and the second inter-CPU communication cannot be performed, and when the second CPU monitoring section 84 judges that the second CPU 81 is in the abnormal state, the second CPU state judging section 74 judges that the second CPU 81 is in the abnormal state. On the other hand, when the first inter-CPU communication and the second inter-CPU communication cannot be performed, and when the first CPU monitoring section 64 judges that the first CPU 61 is in the abnormal state, the first CPU state judging section 94 judges that the first CPU 61 is in the abnormal state.

In this way, in this variation, when the second CPU monitoring section 84 judges that the second CPU 81 is in the abnormal state, the second CPU state judging section 74 judges that the second CPU 81 is in the abnormal state. When the first CPU monitoring section 64 judges that the first CPU 61 is in the abnormal state, the first CPU state judging section 94 judges that the first CPU 61 is in the abnormal state. With this, it is possible to judge the abnormality of the counterpart side, and to improve the detection accuracy of the abnormality of the CPU of the counterpart side. Accordingly, it is possible to appropriately understand the state of the opponent CPU, and to appropriately perform the subsequent process of the own CPU.

Moreover, as described above, in this embodiment, when the first and second inter-CPU communications cannot be performed, and when the second CPU monitoring section 84 judges that the second CPU 81 is in the abnormal state, it is judged that the second CPU 81 is in the abnormal state. Moreover, when the first and second inter-CPU communications cannot be performed, and when the first CPU monitoring section 64 judges that the first CPU 61 is in the abnormal state, it is judged that the first CPU 61 is in the abnormal state. With this, it is possible to further improve the detection accuracy of the abnormality of the counterpart CPU, and to further optimize the subsequent process of the own CPU.

Second Embodiment

Figure 11:
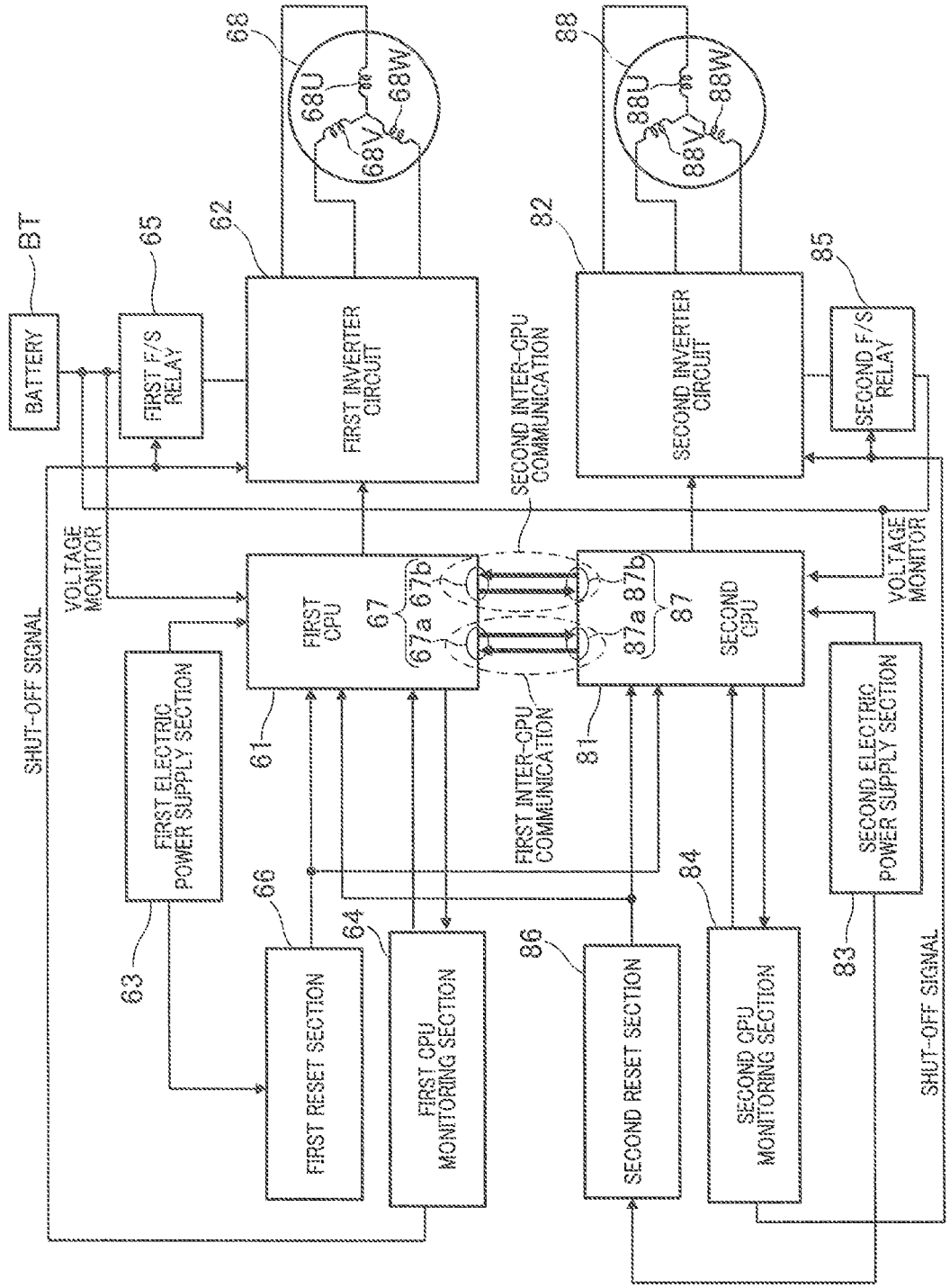
FIG. 11 is a system configuration view showing a control device for a vehicle-mounted apparatus according to a second embodiment of the present invention.
Figure 12:
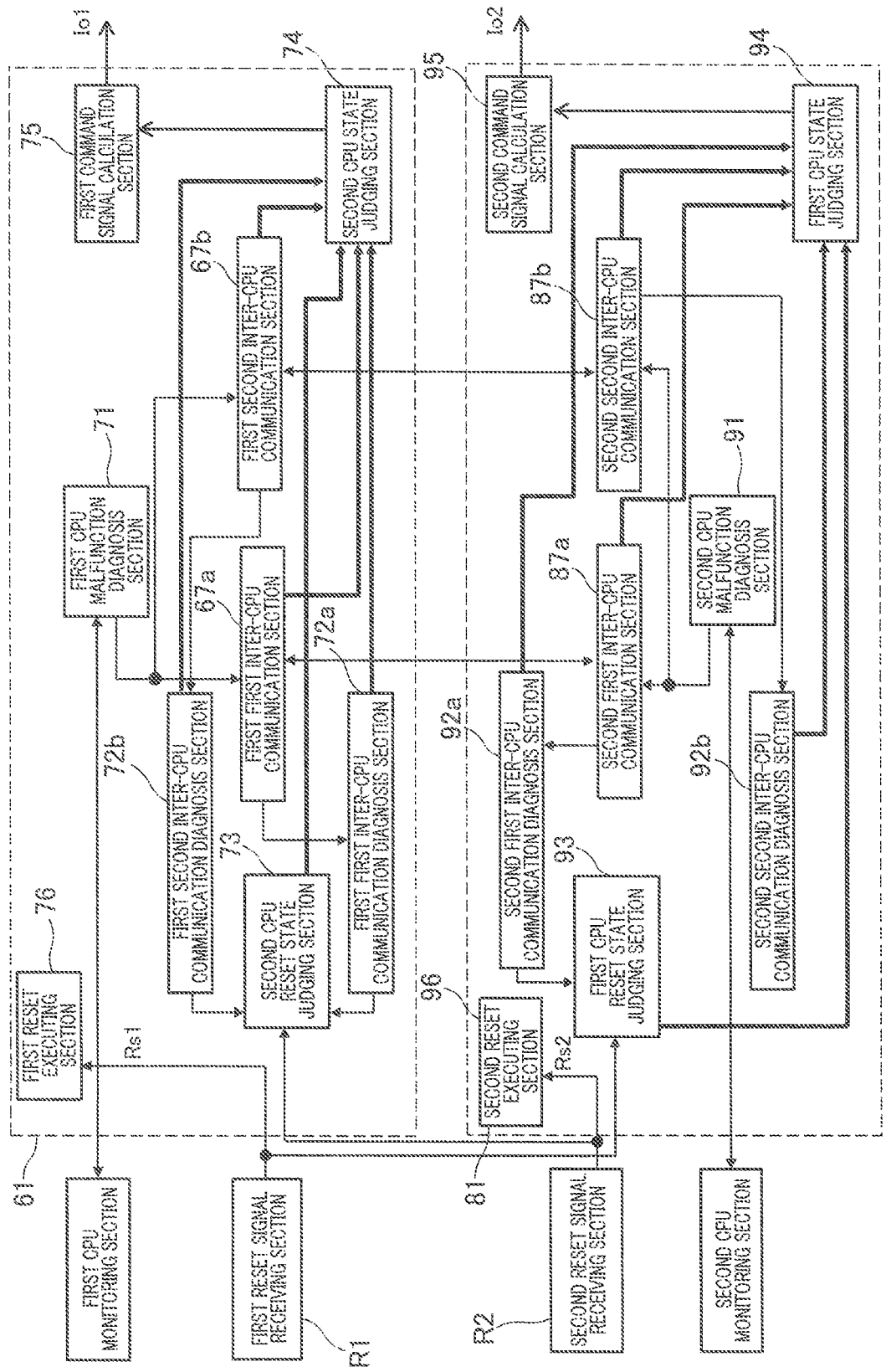
FIG. 12 is a control block diagram showing a first CPU and a second CPU shown in FIG. 11.
Figure 13:
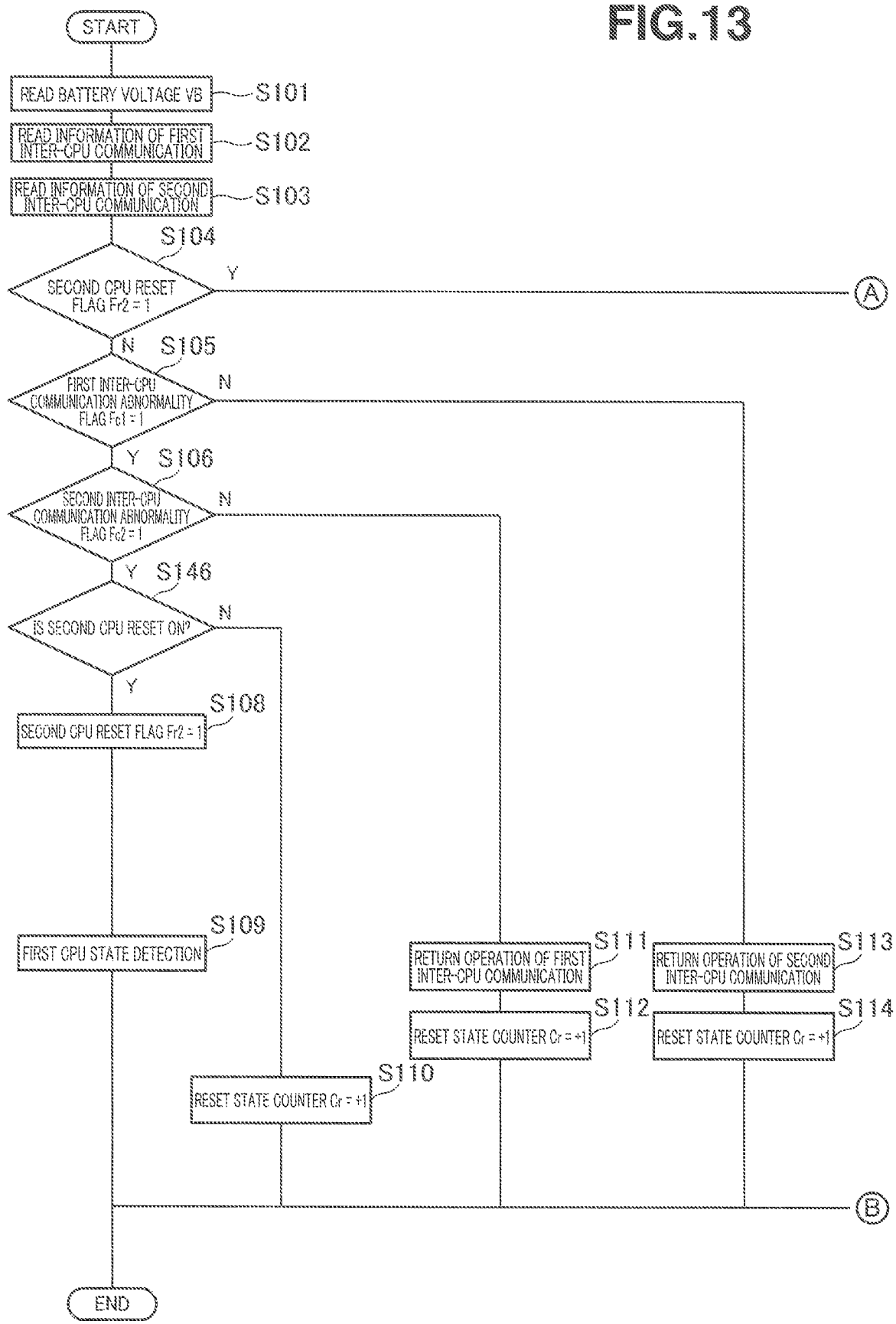
FIG. 13 is a flowchart showing control contents of a first CPU state judging section and a second CPU state judging section shown in FIG. 12.

FIG. 11 to FIG. 13 show a control device of a vehicle-mounted device according to a second embodiment of the present invention. Besides, in the first embodiment, the reset state of the first CPU 61 and the second CPU 81 is judged based on the information of the battery voltage VB and the first and second inter-CPU communications. In this variation, the reset state of the first CPU 61 and the second CPU 81 is judged based on the reset signal from the first reset section 66 and the second reset section 86. The second embodiment has other configurations identical to that of the first embodiment. Accordingly, the configurations identical to those of the first embodiment have the same symbols. That explanations are omitted.

FIG. 11 is a system configuration view of the control device 5. FIG. 12 is a control block diagram showing the first CPU 61 and the second CPU 81. FIG. 13 is a flowchart showing control contents of the first CPU state judging section 94 and the second CPU state judging section 74. Besides, FIG. 13 is a part of the flowchart showing control contents of the first CPU state judging section 94 and the second CPU state judging section 74. FIG. 6, FIG. 7, and FIG. 13 constitute a sequential flowchart.

As shown in FIG. 11 and FIG. 12, the first reset signal Rs1 is directly inputted to the first CPU reset state judging section 93 of the second CPU 81. The second reset signal Rs2 is directly inputted to the second CPU reset state judging section 73 of the first CPU 61. The first CPU 61 and the second CPU 81 are configured to judge the reset state of the other of the CPUs based on the reset signal directly inputted from the other of the CPUs.

Specifically, as shown in FIG. 13, at step S146 corresponding to step S107 of the CPU state judgement flowchart of the first embodiment, it is judged whether or not the second reset signal Rs2 is received (step S146). That is, in case of the judgement of Yes at step S106, it is judged whether or not the second reset signal Rs2 is received (step S146).

In this case, in case of the judgment of No, the reset state counter Cr is incremented (step S110). This program is finished. On the other hand, in case of the judgment of Yes at step S146, the reset flag Fr2 is set (step S108). Then, the state of the own CPU (the first CPU 61 in this embodiment) is sensed (step S109). This program is finished.

In this way, the reset state of the second CPU 81 is judged based on the information of the first reset signal Rs1. Moreover, the explanations of the other control flows are identical to those of the first embodiment. The concrete explanations are omitted by the use of the common step numbers of FIG. 5 in FIG. 13. Moreover, the judgment of the reset state of the first CPU 61 is identical to the judgment of the reset state of the second CPU 81. Accordingly, the concrete explanations are omitted.

As described above, it is possible to judge that one of the CPUs is in the reset state by the reset signal (the first reset signal Rs1 and the second reset signal Rs2) directly received from the counterpart CPU. Accordingly, it is possible to attain the same operations and effects as the first embodiment.

The present invention is not limited to the configurations of the embodiments and so on. The configurations may be varied in accordance with specifications of the vehicle-mounted apparatus to which the present invention is applied, as long as they can attain the operations and effects of the present invention.

For example, in the above-described embodiments, the first and second three phase coils 68 and 88 are arranged to cooperatively drive the same electric motor (the electric motor 4). However, the first and second three phase coils 68 and 88 may be arranged to drive the different electric motors respectively.

Moreover, in the above-described embodiments, when the first CPU state judging section 94 judges the abnormality of the inter-CPU communication, the second command signal calculation section 95 is configured to calculate the command signal (the second command signal Io2) to control the electric motor 4 corresponding to the driving section. However, when the first CPU state judging section 94 judges the abnormality of the inter-CPU communication, the second command signal calculation section 95 may be configured not to calculate the command signal (the second command signal Io2) to control the electric motor 4 corresponding to the driving section.

That is, in one variation according to the embodiment, the first CPU 61 includes a vehicle signal receiving section VS configured to receive a signal transmitted from the vehicle, and a first command signal calculation section 75 configured to calculate the first command signal Io1 which is the command signal to control the electric motor 4 which is the driving section; the second CPU 81 includes a second command signal calculation section 95 configured to calculate the second command signal Io2 which is the command signal to control the electric motor 4 which is the driving section; the first command signal calculation section 75 is configured to calculate the command signal (the first command signal Io1) to control the electric motor 4 which is the driving section when the second CPU state judging section 74 judges that the inter-CPU communication is in the abnormal state; and the second command signal calculation section 95 is configured not to calculate the command signal (the second command signal Io2) to control the electric motor 4 which is the driving section when the first CPU state judging section 94 judges that the inter-CPU communication is in the abnormal state.

In this way, in a case where the second CPU 81 does not include the vehicle signal receiving section VS, and the second CPU 81 is configured to receive the signal from the vehicle through the first CPU 61 by the inter-CPU communication, the second CPU 81 may not receive the signal from the vehicle due to the inter-CPU communication abnormality although the second CPU 81 itself is not in the abnormal state. Accordingly, the control by the second CPU 81 side is stopped. The continuous control is performed only by the first CPU 61 side which can receive the signal from the vehicle. With this, it is possible to improve the reliability of the control device 5.

Moreover, the first command signal calculation section 75 is configured to decrease an output of the first control signal Io1 which is the command signal to control the electric motor 4 which is the driving section when the second CPU state judging section 72 judges that the inter-CPU communication is in the abnormal state.

In this way, by decreasing the output of the electric motor 4, it is possible to inform the driver of the abnormality of the power steering device while continuing the assist control.

Below-described aspects are conceivable as the control device of the vehicle-mounted apparatus according to the above-described embodiments.

In one aspect, a control device for a vehicle-mounted apparatus, the control device includes: a first CPU and a second CPU which are configured to calculate command signals to control a driving section of the vehicle-mounted apparatus; a first reset section configured to output a first reset signal to the first CPU; a second reset section configured to output a second reset signal to the second CPU; a first inter-CPU communication section provided to the first CPU, and configured to perform an inter-CPU communication which is a communication of a signal between the first CPU and the second CPU; a second inter-CPU communication section provided to the second CPU, and configured to perform the inter-CPU communication; a first electric power supply section configured to supply an electric power to the first CPU; a second electric power supply section configured to supply an electric power to the second CPU; a second CPU state judging section provided to the first CPU, and configured to judge a state of the second CPU based on a state of the inter-CPU communication and a voltage value of the electric power supplied from the first electric power supply section, or the second reset signal; and a first CPU state judging section provided to the second CPU, and configured to judge a state of the first CPU based on the state of the inter-CPU communication and a voltage value of the electric power supplied from the second electric power supply section, or the first reset signal.

In the control device of the vehicle-mounted apparatus according to a preferable aspect, the first CPU state judging section is configured to judge that the first CPU is in an abnormal state when the inter-CPU communication is stopped or cannot be performed, when the voltage value of the electric power supplied from the second electric power supply section is equal to or greater than a predetermined value, and when the first reset signal is not outputted; and the second CPU state judging section is configured to judge that the second CPU is in an abnormal state when the inter-CPU communication is stopped or cannot be performed, when the voltage value of the electric power supplied from the first electric power supply section is equal to or greater than a predetermined value, and when the second reset signal is not outputted.

In another aspect, in one of the control devices of the vehicle-mounted apparatus, the first CPU state judging section is configured to judge whether or not the first CPU is in the abnormal state based on the signal transferred from the first CPU when the inter-CPU communication can be performed; and the second CPU state judging section is configured to judge whether or not the second CPU is in the abnormal state based on the signal transferred from the second CPU when the inter-CPU communication can be performed.

In still another aspect, in one of the control devices of the vehicle-mounted apparatus, the first CPU includes a first command signal calculation section configured to calculate a command signal to control the driving section; the second CPU includes a second command signal calculation section configured to calculate a command signal to control the driving section; the first command signal calculation section is configured to calculate the command signal to control the driving section when the second CPU state judging section judges that the second CPU is in the abnormal state; and the second command signal calculation section is configured to calculate the command signal to control the driving section when the first CPU state judging section judges that the first CPU is in the abnormal state.

In still another aspect, in one of the control devices of the vehicle-mounted apparatus, the control device includes a first CPU monitoring section configured to judge whether or not the first CPU is in the abnormal state, and a second CPU monitoring section configured to judge whether or not the second CPU is in the abnormal state; the first CPU state judging section is configured to judge whether the first CPU is in the abnormal state when the inter-CPU communication cannot be performed, and the voltage value of the electric power supplied from the second electric power supply section is equal to or greater than a predetermined value, or when the first CPU monitoring section judges that the first CPU is in the abnormal state; and the second CPU state judging section is configured to judge whether the second CPU is in the abnormal state when the inter-CPU communication cannot be performed, and the voltage value of the electric power supplied from the first electric power supply section is equal to or greater than a predetermined value, or when the second CPU monitoring section judges that the second CPU is in the abnormal state.

In still another aspect, in one of the control devices of the vehicle-mounted apparatus, the first CPU includes a first command signal calculation section configured to calculate the command signal to control the driving section; the second CPU includes a second command signal calculation section configured to calculate the command signal to control the driving section; the first command signal calculation section is configured to calculate the command signal to control the driving section when the second CPU state judging section judges that the second CPU is in the abnormal state; and the second command signal calculation section is configured to calculate the command signal to control the driving section when the first CPU state judging section judges that the first CPU is in the abnormal state.

In still another aspect, in one of the control devices of the vehicle-mounted apparatus, the first inter-CPU communication section includes a first first inter-CPU communication section and a second first inter-CPU communication section; and the second inter-CPU communication section includes a first second inter-CPU communication section configured to perform a first inter-CPU communication between the first second inter-CPU communication section and the first first inter-CPU communication section, and a second second inter-CPU communication section configured to perform a second inter-CPU communication between the second first inter-CPU communication section and the second second inter-CPU communication section.

In still another aspect, in one of the control devices of the vehicle-mounted apparatus, the control device includes a first CPU monitoring section configured to judge whether or not the first CPU is in the abnormal state, and a second CPU monitoring section configured to judge whether or not the second CPU is in the abnormal state; the first CPU state judging section is configured to judge whether the first CPU is in the abnormal state when the first inter-CPU communication and the second inter-CPU communication cannot be performed, and the voltage value of the electric power supplied from the second electric power supply section is equal to or greater than the predetermined value, or when the first CPU monitoring section judges that the first CPU is in the abnormal state, and the first inter-CPU communication and the second inter-CPU communication cannot be performed; and the second CPU state judging section is configured to judge whether the second CPU is in the abnormal state when the first inter-CPU communication and the second inter-CPU communication cannot be performed, and the voltage value of the electric power supplied from the first electric power supply section is equal to or greater than the predetermined value, or when the second CPU monitoring section judges that the second CPU is in the abnormal state, and the first inter-CPU communication and the second inter-CPU communication cannot be performed.

In still another aspect, in one of the control devices of the vehicle-mounted apparatus, the first CPU state judging section is configured to judge that the first CPU is in the reset state when the first inter-CPU communication and the second inter-CPU communication cannot be performed, and the voltage value of the electric power supplied from the second electric power supply section is smaller than the predetermined value; and the second CPU state judging section is configured to judge that the second CPU is in the reset state when the first inter-CPU communication and the second inter-CPU communication cannot be performed, and the voltage value of the electric power supplied from the first electric power supply section is smaller than the predetermined value.

In still another aspect, in one of the control devices of the vehicle-mounted apparatus, when one of the first inter-CPU communication and the second inter-CPU communication can be performed, and the other of the first inter-CPU communication and the second inter-CPU communication cannot be performed, the first CPU state judging section or the second CPU state judging section is configured to judge that the other of the first inter-CPU communication and the second inter-CPU communication is in the abnormal state.

In still another aspect, in one of the control devices of the vehicle-mounted apparatus, the first CPU includes a vehicle signal receiving section configured to receive a signal transmitted from the vehicle, and a first command signal calculation section configured to calculate the command signal to control the driving section; the second CPU includes a second command signal calculation section configured to calculate the command signal to control the driving section; the first command signal calculation section is configured to calculate the command signal to control the driving section when the second CPU state judging section judges that the inter-CPU communication is in the abnormal state; and the second command signal calculation section is configured not to calculate the command signal to control the driving section when the first CPU state judging section judges that the inter-CPU communication is in the abnormal state.

In still another aspect, in one of the control devices of the vehicle-mounted apparatus, the first command signal calculation section is configured to decrease an output of the command signal to control the driving section when the second CPU state judging section judges that the inter-CPU communication is in the abnormal state.

In still another aspect, in one of the control devices of the vehicle-mounted apparatus, the first inter-CPU communication section and the second inter-CPU communication section have different communication types.

In still another aspect, in one of the control devices of the vehicle-mounted apparatus, the first CPU includes a first command signal calculation section configured to calculate the command signal to control the driving section; the second CPU includes a second command signal calculation section configured to calculate a command signal to control the driving section; when the second CPU state judging section judges that the second CPU is in the reset state, the first command signal calculation section is configured to calculate the command signal to control the driving section at least until the second CPU is returned; and when the first CPU state judging section judges that the first CPU is in the reset state, the second command signal calculation section is configured to calculate the command signal to control the driving section at least until the first CPU is returned.

In still another aspect, in one of the control devices of the vehicle-mounted apparatus, the first CPU is configured to reset the first CPU when the second CPU state judging section judges that the second CPU is in the reset state; and the second CPU is configured to reset the second CPU when the first CPU state judging section judges that the first CPU is in the reset state.

In still another aspect, in one of the control devices of the vehicle-mounted apparatus, after one of the first CPU and the second CPU is returned from the reset state, the other of the first CPU and the second CPU is configured to output a synchronous signal to synchronize a control timing to the one of the first CPU and the second CPU which was returned.

The invention claimed is:

1. A control device for a vehicle-mounted apparatus, the control device comprising:
   a first CPU and a second CPU which are configured to calculate command signals to control a driving section of the vehicle-mounted apparatus;
   a first reset section configured to output a first reset signal to the first CPU;
   a second reset section configured to output a second reset signal to the second CPU;
   a first inter-CPU communication section provided to the first CPU, and configured to perform an inter-CPU communication which is a communication of a signal between the first CPU and the second CPU;
   a second inter-CPU communication section provided to the second CPU, and configured to perform the inter-CPU communication;
   a first electric power supply section configured to supply an electric power to the first CPU;
   a second electric power supply section configured to supply an electric power to the second CPU;
   a second CPU state judging section provided to the first CPU, and configured to judge a state of the second CPU based on a state of the inter-CPU communication and a voltage value of the electric power supplied from the first electric power supply section, or the second reset signal; and
   a first CPU state judging section provided to the second CPU, and configured to judge a state of the first CPU based on the state of the inter-CPU communication and a voltage value of the electric power supplied from the second electric power supply section, or the first reset signal,
   wherein the first inter-CPU communication section includes a first first inter-CPU communication section and a second first inter-CPU communication section; and
   the second inter-CPU communication section includes a first second inter-CPU communication section configured to perform a first inter-CPU communication between the first second inter-CPU communication section and the first first inter-CPU communication section, and a second second inter-CPU communication section configured to perform a second inter-CPU communication between the second first inter-CPU communication section and the second second inter-CPU communication section,
   wherein the first CPU state judging section is configured to judge that the first CPU is in the reset state when the first inter-CPU communication and the second inter-CPU communication cannot be performed, and the voltage value of the electric power supplied from the second electric power supply section is smaller than the predetermined value; and
   the second CPU state judging section is configured to judge that the second CPU is in the reset state when the first inter-CPU communication and the second inter-CPU communication cannot be performed, and the voltage value of the electric power supplied from the first electric power supply section is smaller than the predetermined value.

2. The control device for the vehicle-mounted apparatus as claimed in claim 1, wherein the control device comprises a first CPU monitoring section configured to judge whether or not the first CPU is in the abnormal state, and a second CPU monitoring section configured to judge whether or not the second CPU is in the abnormal state;

the first CPU state judging section is configured to judge whether the first CPU is in the abnormal state when the inter-CPU communication cannot be performed, and the voltage value of the electric power supplied from the second electric power supply section is equal to or greater than a predetermined value, or when the first CPU monitoring section judges that the first CPU is in the abnormal state; and the second CPU state judging section is configured to judge whether the second CPU is in the abnormal state when the inter-CPU communication cannot be performed, and the voltage value of the electric power supplied from the first electric power supply section is equal to or greater than a predetermined value, or when the second CPU monitoring section judges that the second CPU is in the abnormal state.

3. The control device for the vehicle-mounted apparatus as claimed in claim 2, wherein the first CPU includes a first command signal calculation section configured to calculate the command signal to control the driving section;

the second CPU includes a second command signal calculation section configured to calculate the command signal to control the driving section;

the first command signal calculation section is configured to calculate the command signal to control the driving section when the second CPU state judging section judges that the second CPU is in the abnormal state; and the second command signal calculation section is configured to calculate the command signal to control the driving section when the first CPU state judging section judges that the first CPU is in the abnormal state.

4. The control device for the vehicle-mounted apparatus as claimed in claim 1, wherein the control device comprises a first CPU monitoring section configured to judge whether or not the first CPU is in the abnormal state, and a second CPU monitoring section configured to judge whether or not the second CPU is in the abnormal state;

the first CPU state judging section is configured to judge whether the first CPU is in the abnormal state when the first inter-CPU communication and the second inter-CPU communication cannot be performed, and the voltage value of the electric power supplied from the second electric power supply section is equal to or greater than the predetermined value, or when the first CPU monitoring section judges that the first CPU is in the abnormal state, and the first inter-CPU communication and the second inter-CPU communication cannot be performed; and the second CPU state judging section is configured to judge whether the second CPU is in the abnormal state when the first inter-CPU communication and the second inter-CPU communication cannot be performed, and the voltage value of the electric power supplied from the first electric power supply section is equal to or greater than the predetermined value, or when the second CPU monitoring section judges that the second CPU is in the abnormal state, and the first inter-CPU communication and the second inter-CPU communication cannot be performed.

5. The control device for the vehicle-mounted apparatus as claimed in claim 1, wherein when one of the first inter-CPU communication and the second inter-CPU communication can be performed, and the other of the first inter-CPU communication and the second inter-CPU communication cannot be performed, the first CPU state judging section or the second CPU state judging section is configured to judge that the other of the first inter-CPU communication and the second inter-CPU communication is in the abnormal state.

6. The control device for the vehicle-mounted apparatus as claimed in claim 5, wherein the first CPU includes a vehicle signal receiving section configured to receive a signal transmitted from the vehicle, and a first command signal calculation section configured to calculate the command signal to control the driving section;

the second CPU includes a second command signal calculation section configured to calculate the command signal to control the driving section;

the first command signal calculation section is configured to calculate the command signal to control the driving section when the second CPU state judging section judges that the inter-CPU communication is in the abnormal state; and the second command signal calculation section is configured not to calculate the command signal to control the driving section when the first CPU state judging section judges that the inter-CPU communication is in the abnormal state.

7. The control device for the vehicle-mounted apparatus as claimed in claim 6, wherein the first command signal calculation section is configured to decrease an output of the command signal to control the driving section when the second CPU state judging section judges that the inter-CPU communication is in the abnormal state.

8. The control device for the vehicle-mounted apparatus as claimed in claim 1, wherein the first inter-CPU communication section and the second inter-CPU communication section have different communication types.

9. The control device for the vehicle-mounted apparatus as claimed in claim 1, wherein the first CPU includes a first command signal calculation section configured to calculate the command signal to control the driving section;

the second CPU includes a second command signal calculation section configured to calculate a command signal to control the driving section;

when the second CPU state judging section judges that the second CPU is in the reset state, the first command signal calculation section is configured to calculate the command signal to control the driving section at least until the second CPU is returned; and when the first CPU state judging section judges that the first CPU is in the reset state, the second command signal calculation section is configured to calculate the command signal to control the driving section at least until the first CPU is returned.

10. The control device for the vehicle-mounted apparatus as claimed in claim 1, wherein the first CPU is configured to reset the first CPU when the second CPU state judging section judges that the second CPU is in the reset state; and the second CPU is configured to reset the second CPU when the first CPU state judging section judges that the first CPU is in the reset state.

11. The control device for the vehicle-mounted apparatus as claimed in claim 1, wherein after one of the first CPU and the second CPU is returned from the reset state, the other of the first CPU and the second CPU is configured to output a synchronous signal to synchronize a control timing to the one of the first CPU and the second CPU which was returned.

12. A control device for a vehicle-mounted apparatus, the control device comprising:
- a first CPU and a second CPU which are configured to calculate command signals to control a driving section of the vehicle-mounted apparatus;
- a first reset section configured to output a first reset signal to the first CPU;
- a second reset section configured to output a second reset signal to the second CPU;
- a first inter-CPU communication section provided to the first CPU, and configured to perform an inter-CPU communication which is a communication of a signal between the first CPU and the second CPU;
- a second inter-CPU communication section provided to the second CPU, and configured to perform the inter-CPU communication;
- a first electric power supply section configured to supply an electric power to the first CPU;
- a second electric power supply section configured to supply an electric power to the second CPU;
- a second CPU state judging section provided to the first CPU, and configured to judge a state of the second CPU based on a state of the inter-CPU communication and a voltage value of the electric power supplied from the first electric power supply section, or the second reset signal; and
- a first CPU state judging section provided to the second CPU, and configured to judge a state of the first CPU based on the state of the inter-CPU communication and a voltage value of the electric power supplied from the second electric power supply section, or the first reset signal,
- wherein the first CPU state judging section is configured to judge that the first CPU is in an abnormal state when the inter-CPU communication is stopped or cannot be performed, when the voltage value of the electric power supplied from the second electric power supply section is equal to or greater than a predetermined value, and when the first reset signal is not outputted; and
- the second CPU state judging section is configured to judge that the second CPU is in an abnormal state when the inter-CPU communication is stopped or cannot be performed, when the voltage value of the electric power supplied from the first electric power supply section is equal to or greater than a predetermined value, and when the second reset signal is not outputted.

13. The control device for the vehicle-mounted apparatus as claimed in claim 12, wherein the first CPU state judging section is configured to judge whether or not the first CPU is in the abnormal state based on the signal transferred from the first CPU when the inter-CPU communication can be performed; and
- the second CPU state judging section is configured to judge whether or not the second CPU is in the abnormal state based on the signal transferred from the second CPU when the inter-CPU communication can be performed.

14. The control device for the vehicle-mounted apparatus as claimed in claim 13, wherein the first CPU includes a first command signal calculation section configured to calculate a command signal to control the driving section;
- the second CPU includes a second command signal calculation section configured to calculate a command signal to control the driving section;
- the first command signal calculation section is configured to calculate the command signal to control the driving section when the second CPU state judging section judges that the second CPU is in the abnormal state; and
- the second command signal calculation section is configured to calculate the command signal to control the driving section when the first CPU state judging section judges that the first CPU is in the abnormal state.

* * * * *